(12) United States Patent
Ito et al.

(10) Patent No.: US 8,307,803 B2
(45) Date of Patent: Nov. 13, 2012

(54) WORK MACHINE

(75) Inventors: Tomoki Ito, Saitama (JP); Hideaki Kobayashi, Saitama (JP); Tomomi Nakaya, Saitama (JP); Masayuki Sasaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 792 days.

(21) Appl. No.: 12/471,001

(22) Filed: May 22, 2009

(65) Prior Publication Data

US 2009/0293837 A1    Dec. 3, 2009

(30) Foreign Application Priority Data

| May 28, 2008 | (JP) | 2008-139893 |
| May 28, 2008 | (JP) | 2008-139935 |
| May 28, 2008 | (JP) | 2008-139965 |
| May 28, 2008 | (JP) | 2008-140019 |

(51) Int. Cl.
 *F02B 67/00* (2006.01)
(52) U.S. Cl. ............... 123/195 A; 123/27 GE; 123/527; 141/18
(58) Field of Classification Search ......... 123/198, 123/1 R, 2, 195 R, 195 A, 198 D, 27 GE, 123/198 R, 527; 180/69.4, 69.5
See application file for complete search history.

(56) References Cited

U.S. PATENT DOCUMENTS 5,799,640 A * 9/1998 Sugimoto et al. ............. 123/527

FOREIGN PATENT DOCUMENTS

| FR | 2 882 011 A1 | 8/2006 |
| GB | 2 318 861 A | 5/1998 |
| JP | 62-132269 U | 8/1987 |
| JP | 62-167201 | 5/1989 |
| JP | 6-22762 U | 3/1994 |
| JP | 7-37562 A | 2/1995 |
| JP | 7-117496 A | 5/1995 |
| JP | 3024966 U | 3/1996 |
| JP | 10-131809 A | 5/1998 |
| JP | 10169511 A | 6/1998 |
| JP | 11170876 * | 6/1999 |
| JP | 2003-123715 A | 4/2003 |
| JP | 2003-123715 A | 4/2003 |
| KR | 1991-0007171 | 9/1991 |

* cited by examiner

*Primary Examiner* — Noah Kamen
*Assistant Examiner* — Hung Q Nguyen
(74) *Attorney, Agent, or Firm* — Arent Fox LLP

(57) ABSTRACT

A work machine to which a cassette gas cylinder is detachably attached is disclosed. The cassette gas cylinder is accommodated inside a gas cylinder case. The gas cylinder case for accommodating the cassette gas cylinder is detachably attached to the work machine so that the gas cylinder case wherein the cassette gas cylinder is accommodated can be transported together with the cylinder.

17 Claims, 20 Drawing Sheets

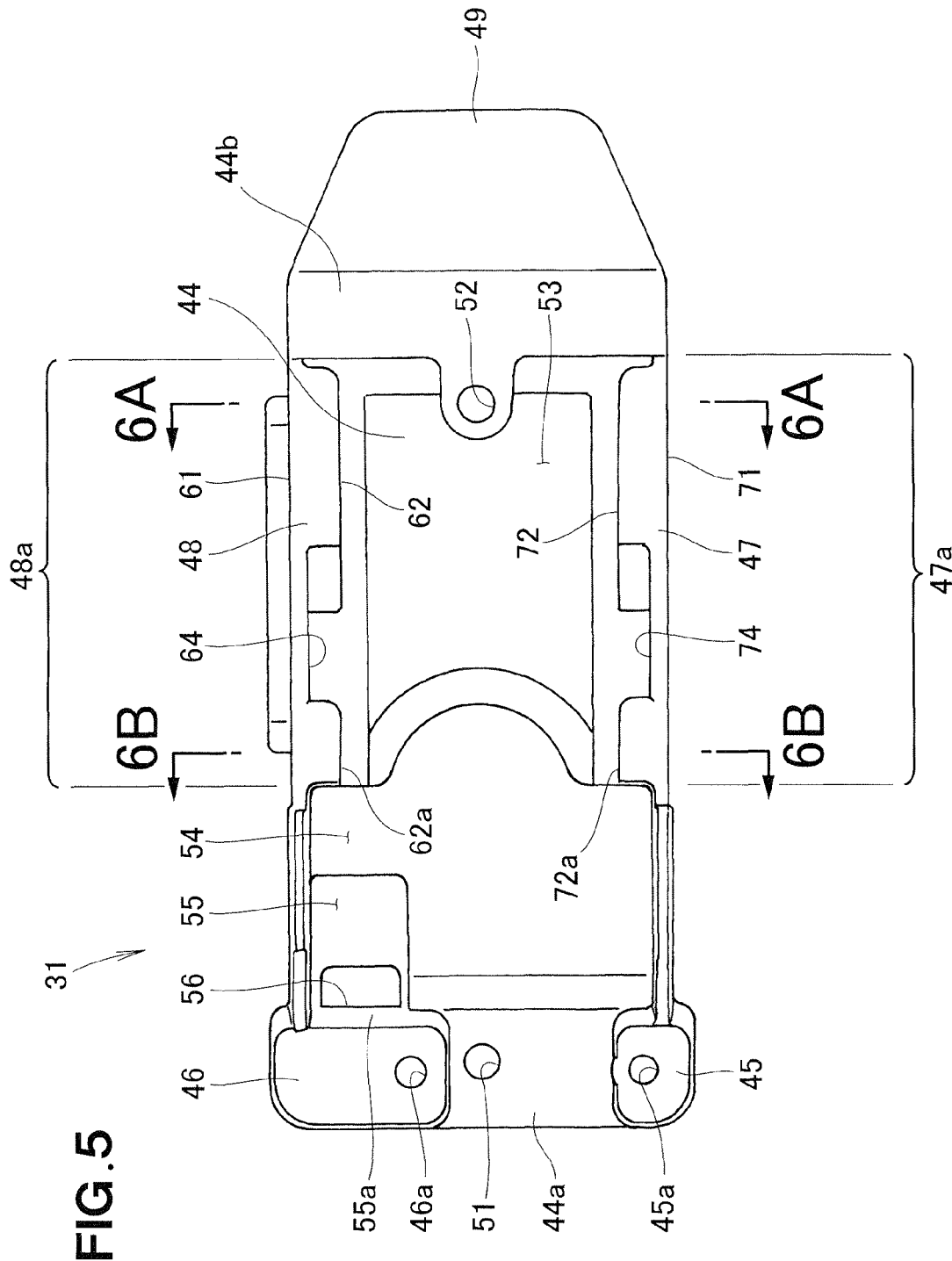

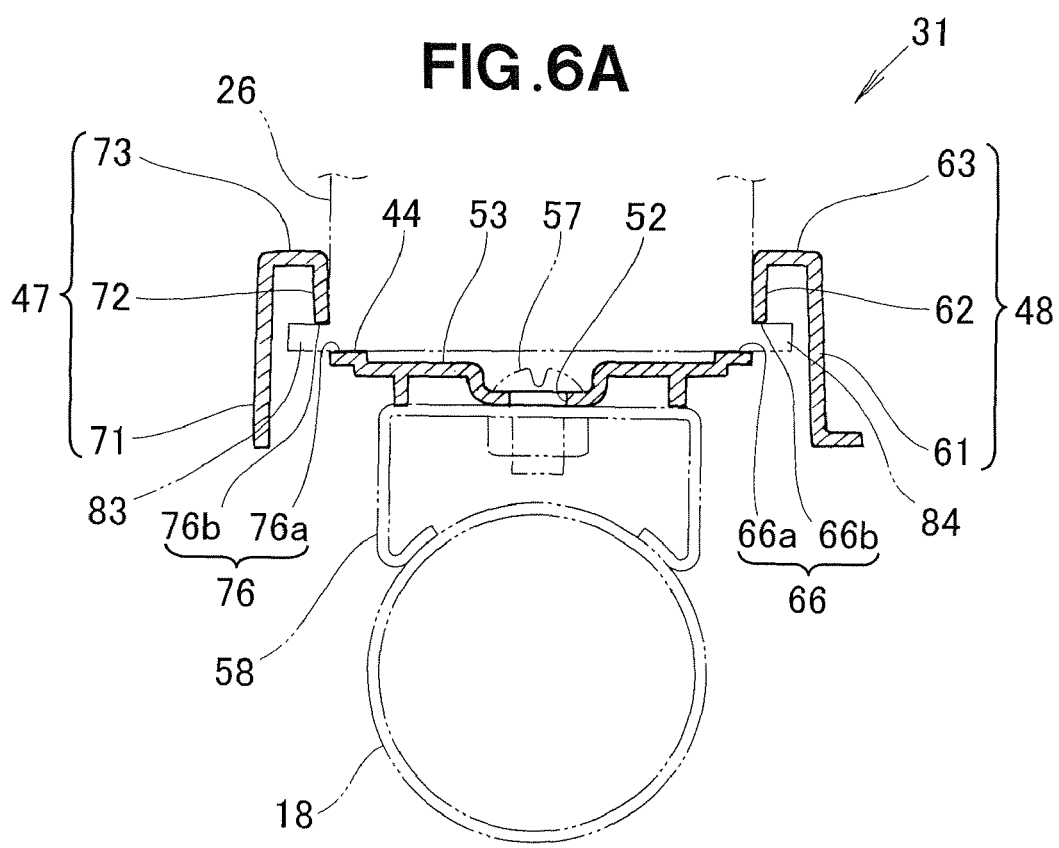
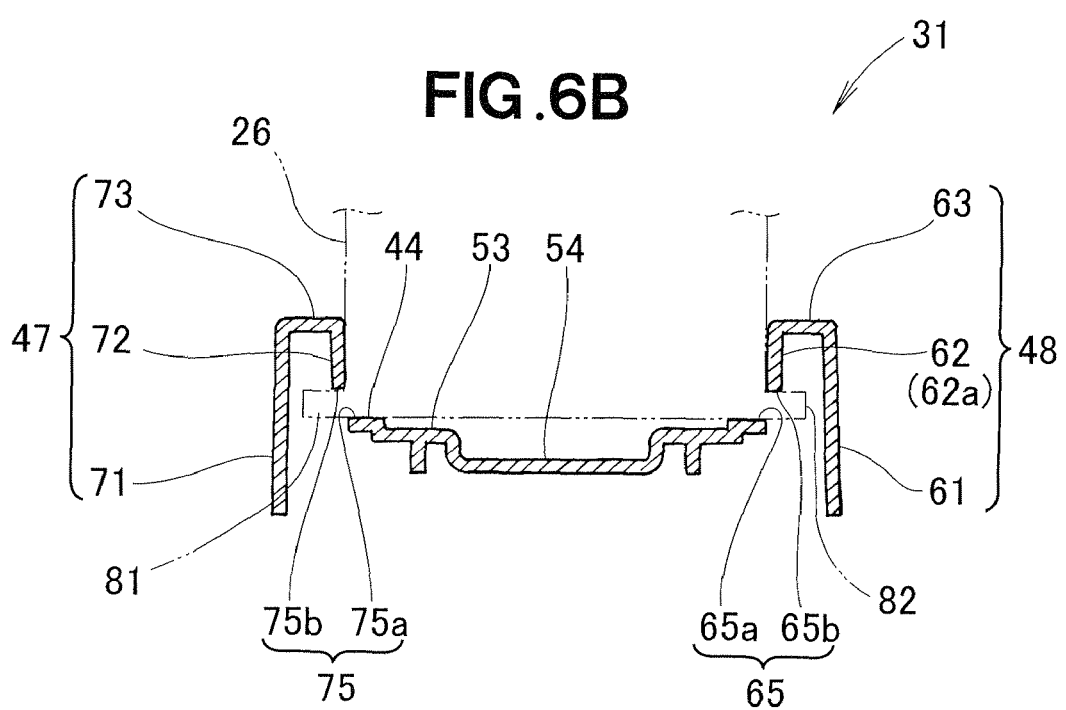

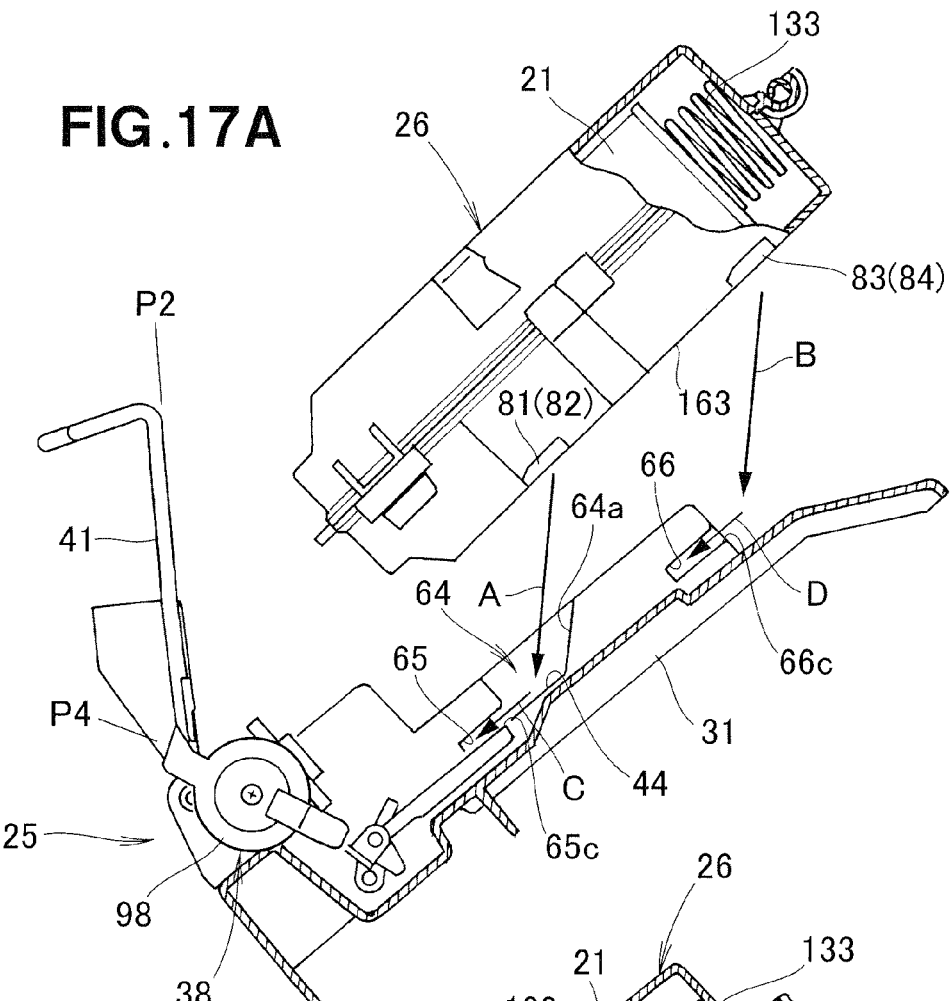
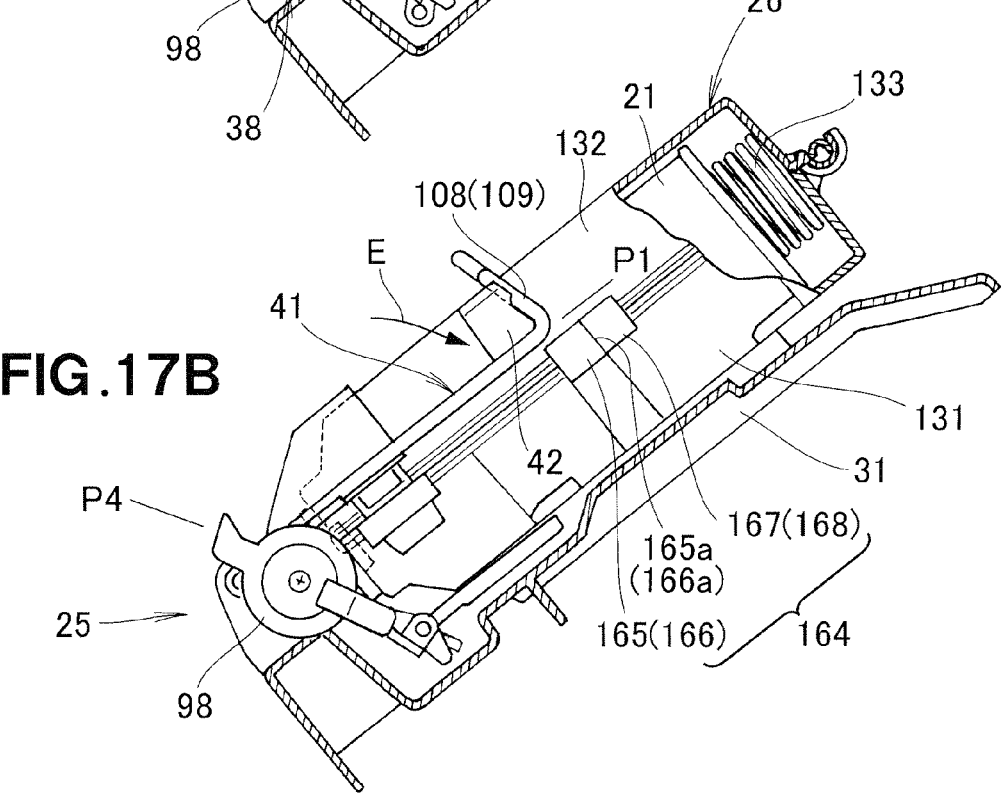

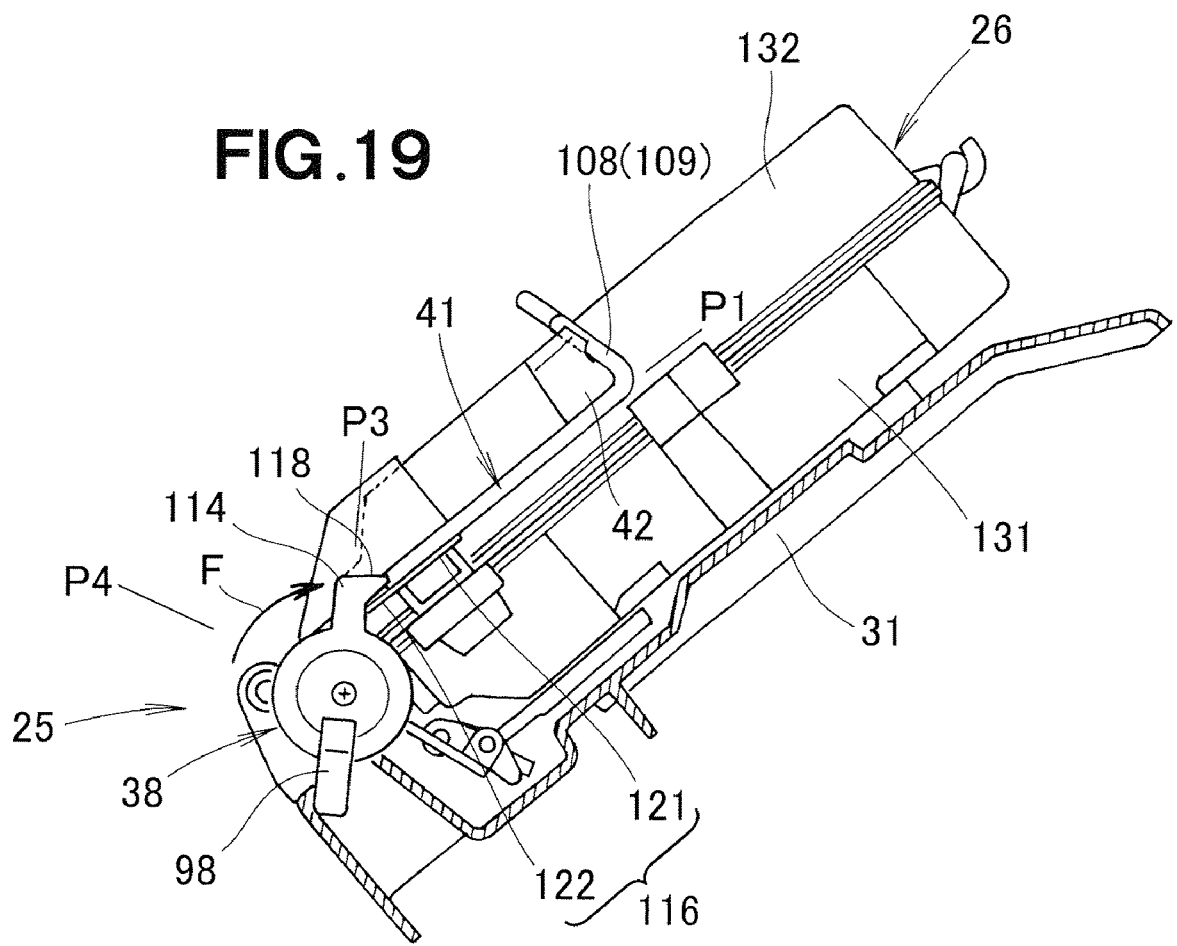

WORK MACHINE

FIELD OF THE INVENTION

The present invention relates to a work machine provided with a cassette gas cylinder for fueling an engine carried on a body of the work machine.

BACKGROUND OF THE INVENTION

A gas-engine-powered work machine is known from Japanese Patent Application Laid-Open Publication No. 10-131809 (JP 10-131809 A). The known gas-engine-powered work machine comprises a gas engine carried on a body of the work machine, a handle post extending upwardly rearwardly from a rear part of the machine body, a gas cylinder case provided on the handle post, and a cassette gas cylinder accommodated in the gas cylinder case.

In the work machine, the cassette gas cylinder is attached to the handle post via the gas cylinder case. With the cassette gas cylinder attached to the handle post, fuel is fed from the cassette gas cylinder to the gas engine to drive the engine.

However, since the cassette gas cylinder is attached through the use of a structure in which the gas cylinder case is attached to the handle post, the cassette gas cylinder must be separated from the gas cylinder case and transported separately when carried by hand. The cassette gas cylinder may therefore be subjected to impact or heat when transported, and dust may also adhere to the cassette gas cylinder.

Since the cassette gas cylinder is a cylindrical vessel, it is possible for the cassette gas cylinder to be misaligned when stored in the gas cylinder case. The cassette gas cylinder must therefore be precisely positioned in place. Attaching the cassette gas cylinder can thus be a complex operation.

SUMMARY OF THE INVENTION

It is therefore an object of the present invention to provide a work machine whereby a cassette gas cylinder can be prevented from being subjected to impact or heat, and adhesion of dust to the cassette gas cylinder can be prevented during transport of the cassette gas cylinder, and whereby the cassette gas cylinder can easily be positioned in proper orientation.

According to one aspect of the present invention, there is provided a work machine comprising a machine body, an engine mounted to the machine body, a cassette gas cylinder for feeding fuel to the engine, and a gas cylinder case for accommodating the cassette gas cylinder, the gas cylinder case being detachably attached to the work machine.

The present invention thus enables detachable attachment of the gas cylinder case to the work machine. The cassette gas cylinder can thereby be transported while being accommodated in the gas cylinder case. The cassette gas cylinder can thereby be covered by the gas cylinder case when the cassette gas cylinder is being transported. Consequently, the cassette gas cylinder can be prevented from being subjected to direct impact or heat, and dust can be prevented from adhering to the cassette gas cylinder.

Preferably, the cassette gas cylinder is provided with a base, a cut-out part is formed in a flange of the base, and a positioning protrusion capable of engaging with the cut-out part is provided inside the gas cylinder case. The cassette gas cylinder can therefore be easily positioned by engaging the cut-out part in the flange with the positioning protrusion when the cassette gas cylinder is accommodated in the gas cylinder case.

Desirably, the gas cylinder case comprises an upper case half and a lower case half for clamping an external peripheral part of the flange from the vertical direction, locking tabs are provided to any one of the upper case half and the lower case half, locking tab receivers for retaining the locking tabs are provided to the other of the upper case half and the lower case half, and the upper case half and the lower case half are maintained in an assembled state by the locking tabs being retained by the locking tab receivers. Consequently, when the cut-out part is not engaged with the positioning protrusion, and the flange is not in the predetermined position, for example, assembly of the upper and lower case halves can be blocked by the flange. It is thereby possible to reliably prevent the cassette gas cylinder from being accommodated in the gas cylinder case without being positioned in the predetermined position.

In a preferred form, the upper case half and the lower case half have a mating part, and the mating part is a labyrinth structure. The water resistance of the mating parts of each of the upper case half and the lower case half is thus increased, and water can be prevented from penetrating into the gas cylinder case.

Preferably, the work machine further comprises a retaining member for retaining the gas cylinder case in a state of attachment to the work machine; a switch valve for switching between a fuel feeding state of feeding the fuel to the engine and a fuel cutoff state of stopping feeding of the fuel to the engine; and valve coupling means for switching the switch valve from the fuel feeding state to the fuel cutoff state in conjunction with movement of the retaining member when retention of the gas cylinder case by the retaining member is released. Consequently, when the gas cylinder case in which the cassette gas cylinder is accommodated is separated from the work machine, there is no need to separately operate the switch valve to switch from the fuel feeding state to the fuel cutoff state. The gas cylinder case can thereby be separated from the work machine by a simple sequence of operations, and ease of use can be enhanced.

Desirably, the switch valve is provided with an operating lever for switching between the fuel feeding state and the fuel cutoff state; the valve coupling means is provided with a driven protrusion that protrudes from the operating lever, and a driving protrusion that can be contacted by the driven protrusion, the driving protrusion being provided to the retaining member; the driven protrusion makes contact with the driving protrusion when a switch is made to the fuel feeding state by the operating lever in a state in which the gas cylinder case is retained by the retaining member; and when the retaining member moves in the direction of releasing retention of the gas cylinder case, the driven protrusion is moved by the driving protrusion, and the operating lever moves to the position of the fuel cutoff state. Consequently, the switch valve can be switched from the fuel feeding state to the fuel cutoff state in conjunction with the movement of the retaining member by a simple structure.

In a preferred form, the gas cylinder case has a latching part for locking the retaining member in place, while the retaining member is urged by a locking spring so as to be retained in a state of being latched to the latching part by the locking spring. Consequently, the gas cylinder case can be removed from the work machine by a simple operation merely by disengaging the retaining member from the latching part against the urging force of the locking spring, and ease of use can be enhanced.

Preferably, the gas cylinder case comprises including an upper case half and a lower case half, the latching part is provided to the upper case half, and misalignment prevention means is provided to the upper and lower case halves so that the upper case half is not misaligned in the longitudinal direction with respect to the lower case half in a state in which the retaining member is latched on the latching part. The upper and lower case halves, i.e., the gas cylinder case, can therefore be satisfactorily retained by the retaining member.

Desirably, the misalignment prevention means comprises left and right stoppers provided to the lower case half, and left and right latching parts for engaging with the left and right stoppers, respectively, the latching parts being provided to the upper case half. The gas cylinder case composed of case halves can therefore be satisfactorily retained by a simple structure.

Preferably, the gas cylinder case is detachably attached to a case mount provided to the work machine, the case mount has a base support for supporting the base provided to the cassette gas cylinder, any one of the gas cylinder case and the case mount has sliders for engaging with the other of the gas cylinder case and the case mount, and the other of the gas cylinder case and the case mount has slider guides for supporting the sliders so that the sliders can slide toward the base support.

Consequently, the sliders are supported by the slider guides, and the sliders can thereby be slid toward the base support without coming off the slider guides. Since the gas cylinder case can thus be positioned with respect to the base support by the simple operation of sliding the sliders, the gas cylinder case in which the cassette gas cylinder is accommodated can be attached to the case mount by a simple sequence of operations.

Desirably, the case mount has a debris discharge port for discharging debris, the debris discharge port being positioned at the lowermost part of a bottom part of the case mount. Maintenance for removing sand, dead leaves, and other debris from inside the case mount can therefore be simplified.

In a preferred form, the work machine is provided with a base support for supporting the base provided to the cassette gas cylinder while the base support is provided with a flange receiving part with which a flange makes contact, the flange being formed along the external periphery of the base.

The flange formed along the external periphery of the base acts as a collar having a relatively large radius. Consequently, the cassette gas cylinder can be reliably supported by the flange part due to the flange of the cassette gas cylinder making contact with the flange receiving part. The cassette gas cylinder can thereby be prevented from being shaken by the vibration of the work machine, and the cassette gas cylinder can be stably supported.

Preferably, the gas cylinder case in which the cassette gas cylinder is accommodated has an opening through which the flange of the cassette gas cylinder is exposed to the outside, the opening being at the distal end of the gas cylinder case, and an elastic member for urging the cassette gas cylinder toward the opening is provided at the proximal end of the gas cylinder case. Consequently, the cassette gas cylinder is urged by the elastic member, whereby a state can be maintained in which the flange is exposed to the outside, the cassette gas cylinder can be prevented from being shaken by the vibration of the work machine, and the cassette gas cylinder can be stably supported.

Desirably, the gas cylinder case is retained by a retaining member provided to the work machine, the retaining member latches onto a latching part provided to the gas cylinder case, and the gas cylinder case is urged toward the flange receiving part by the retaining member that is latched onto the latching part, whereby the flange of the cassette gas cylinder comes in contact with the flange receiving part.

The retaining member is thus locked in place by the latching part, whereby the gas cylinder case can be urged toward the flange receiving part by the retaining member, and the flange of the cassette gas cylinder can be brought into contact with the flange receiving part. The cassette gas cylinder can thereby be reliably retained by the flange part, and the cassette gas cylinder accommodated in the gas cylinder case can be stably supported.

The elastic member may be a coil spring; the gas cylinder case may comprise an upper case half and a lower case half; the gas cylinder case may include fitting grooves in which a proximal end of the coil spring fits, and a retaining protrusion for keeping the proximal end of the coil spring fitted in the fitting grooves, the fitting grooves and the retaining protrusion being provided at a proximal end of one of the upper case half and the lower case half. An elastic member can therefore be provided inside the gas cylinder case by a simple structure.

BRIEF DESCRIPTION OF THE DRAWINGS

Certain preferred embodiments of the present invention will be described in detail below, by way of example only, with reference to the accompanying drawings, in which:

FIG. 5 is a top plan view showing the receiver body of FIG. 4;

FIG. 6A is a cross-sectional view taken along line 6A-6A of FIG. 5, while FIG. 6B is a cross-sectional view taken along line 6B-6B of FIG. 5;

FIGS. 17A and 17B are views showing the procedure for attaching the gas cylinder case to the receiver;

FIG. 19 is a view showing the switch valve switched to a fuel feed state; and

DETAILED DESCRIPTION OF THE PREFERRED EMBODIMENTS

Hereinafter, the present invention will be described as having been embodied in a walk-behind cultivator but the cultivator is merely exemplary and the invention should not be construed as being limited to application to such a cultivator.

Figure 1:
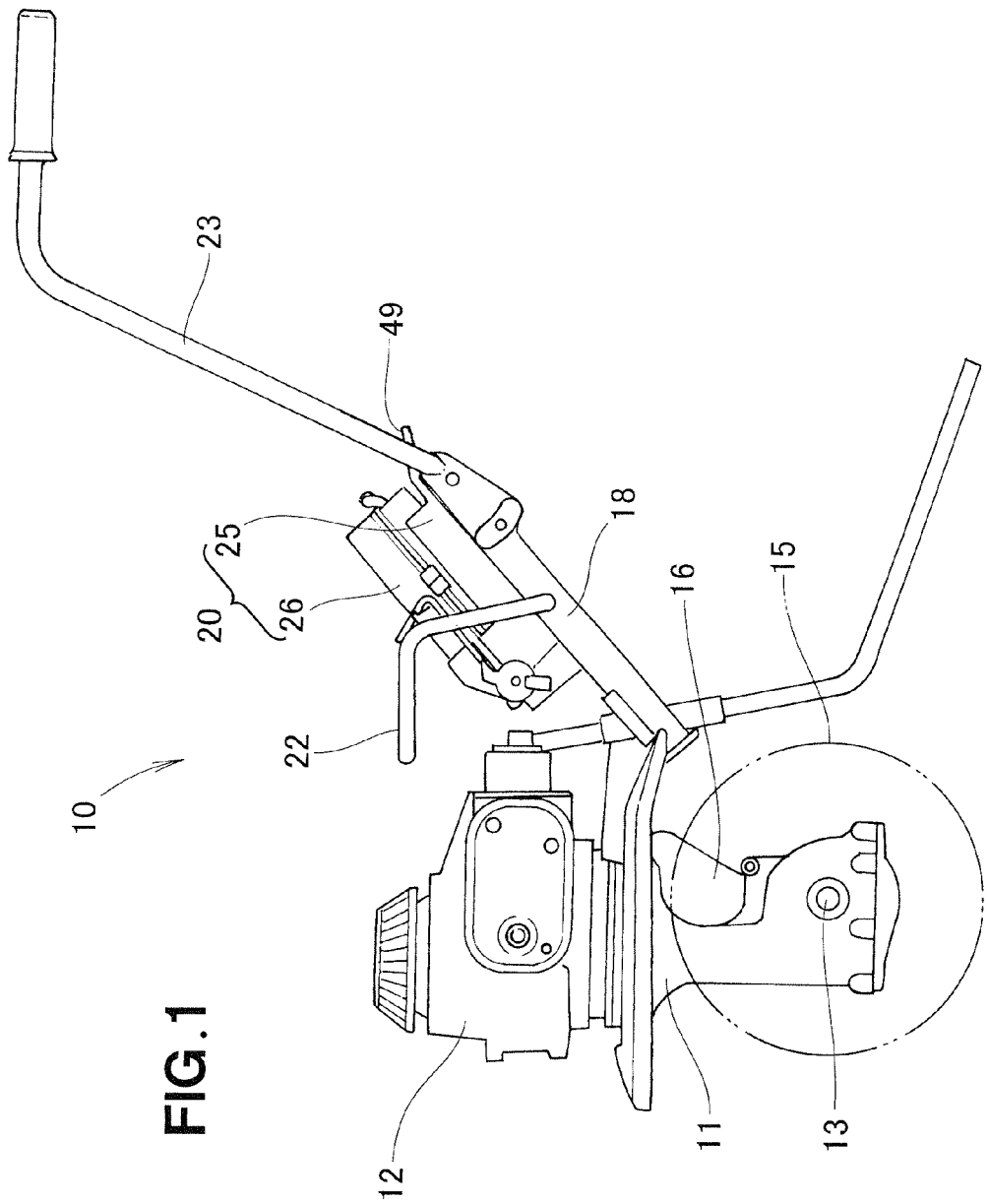
FIG. 1 is a side elevational view showing a work machine according to an embodiment of present embodiment, with a gas cylinder case accommodating a cassette gas cylinder attached.

As shown in FIG. 1, a work machine 10 is provided with a gas engine 12 that is mounted at the upper end of a machine body 11; a cultivator shaft 13 provided below the gas engine 12; a plurality of cultivator claws 15 provided to the cultivator shaft 13; a support bracket 16 provided to the machine body 11; a handle column 18 that extends upward and to the rear from the support bracket 16; a cassette gas cylinder attachment structure 20 provided to the handle column 18; a cassette gas cylinder 21 (FIG. 10) attached to the cassette gas cylinder attachment structure 20; a carry handle 22 used for transport that is provided around the cassette gas cylinder attachment structure 20; and an operating handle 23 provided to the upper end of the handle column 18.

This work machine 10 is a walk-behind cultivator in which the power of the gas engine 12 is transmitted to the cultivator shaft 13 to rotate the cultivator shaft 13, whereby the cultivator travels while soil is cultivated by the plurality of cultivator claws 15.

The gas engine 12 is an engine driven by a supply of liquid fuel gas (referred to as fuel hereinafter) 24 (see FIG. 10) that is fed from the cassette gas cylinder 21.

The cassette gas cylinder attachment structure 20 has a receiver (case mount) 25 provided to the handle column 18, and a gas cylinder case 26 that is detachably provided to the receiver 25.

The receiver 25 will first be described based on FIGS. 2 through 8.

The receiver 25 has a receiver body 31 provided to the handle column 18, an attachment bracket 32 provided to a distal end 31a of the receiver body 31, a base support/switch valve 33 fastened together with the attachment bracket 32 to the distal end 31a of the receiver body 31, a case retaining means 34 provided to the attachment bracket 32, and a valve coupling means 35 for coupling a switch valve 38 to the case retaining means 34.

Figure 2:
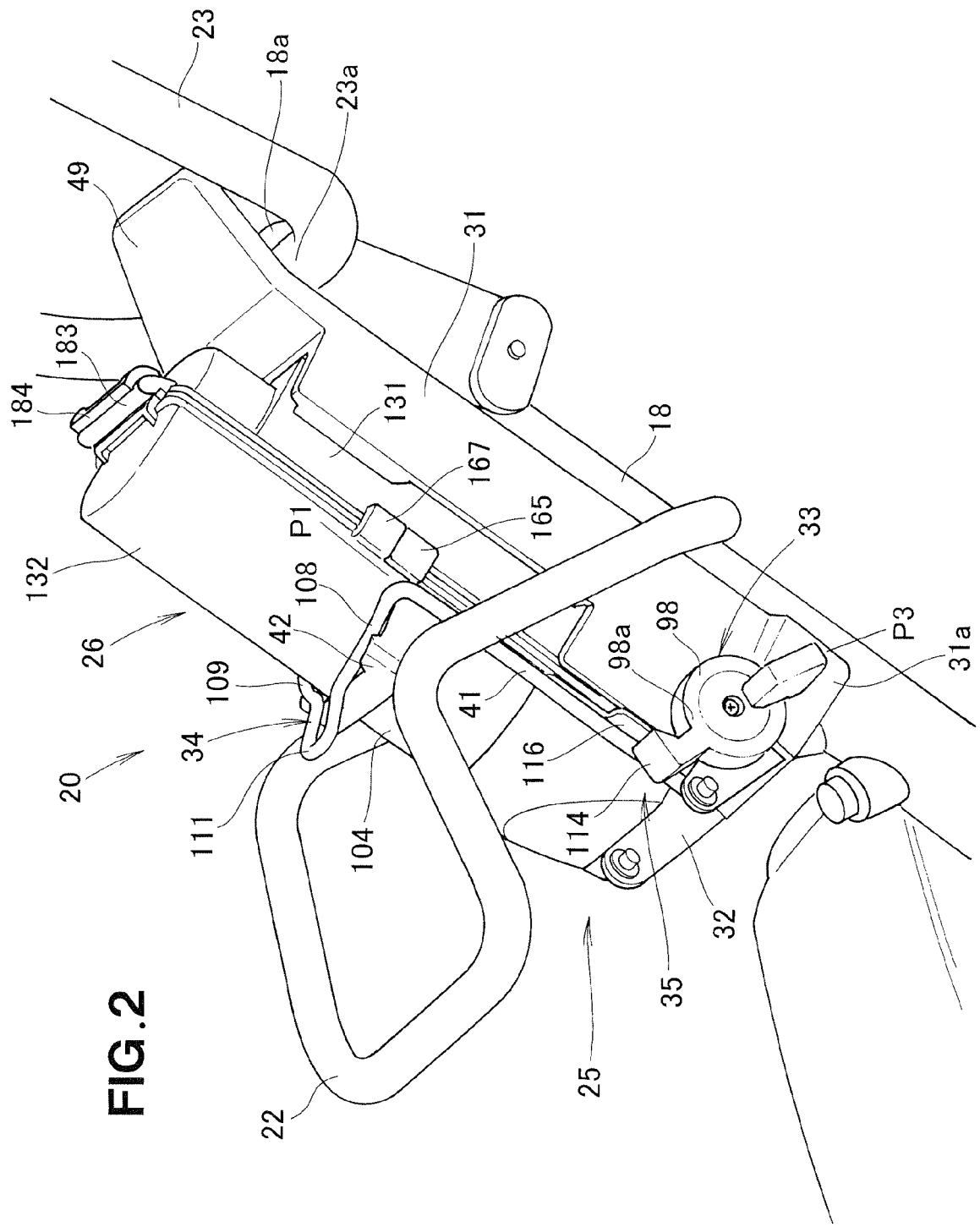
FIG. 2 is a perspective view showing a manner of attachment of the gas cylinder case of FIG. 1.

In the receiver 25, the gas cylinder case 26 can be retained in the receiver 25 by locking a retaining rod (retaining member) 41 of the case retaining means 34 with a latching part 42 at a retention position P1 (FIG. 2). The gas cylinder case 26 is retained in the receiver 25, whereby the cassette gas cylinder 21 is retained in a state of attachment to the work machine 10.

Figure 3:
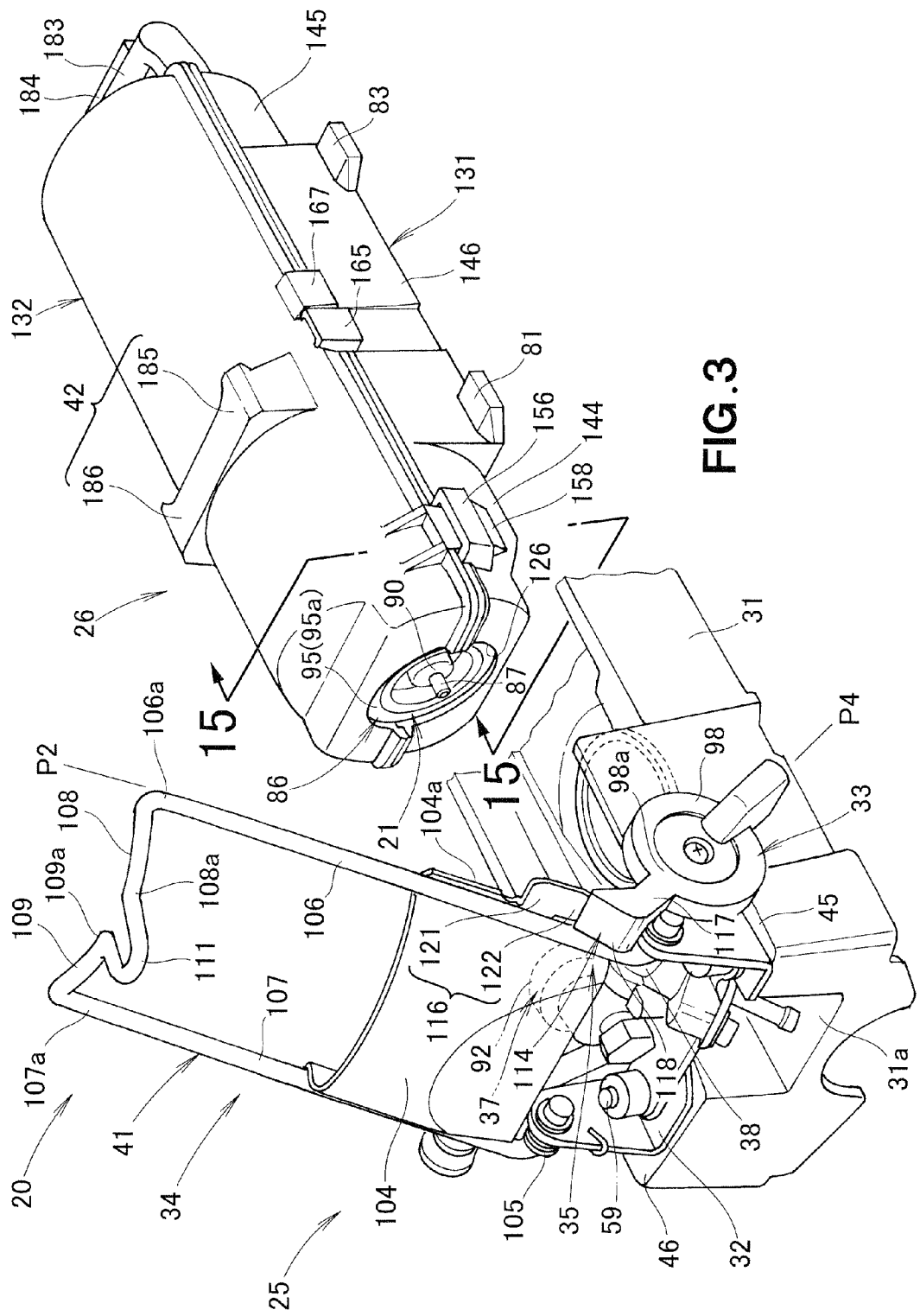
FIG. 3 is a perspective view showing the gas cylinder case detached from a receiver.

The gas cylinder case 26 can be removed from the receiver 25 by removing the retaining rod 41 from the latching part 42 and placing the retaining rod 41 in the released position P2 (see FIG. 3).

The gas cylinder case 26 is thus detachably attached to the receiver 25, and can thereby be removed from the receiver 25. The cassette gas cylinder 21 (FIG. 8) can thereby be transported while being accommodated in the gas cylinder case 26. The cassette gas cylinder 21 can thereby be covered by the gas cylinder case 26 during transport of the cassette gas cylinder 21. Consequently, the cassette gas cylinder 21 can be prevented from being subjected to impact or heat, and dust and the like can be prevented from adhering to the cassette gas cylinder 21.

As shown in FIGS. 4, 5, 6A, and 6B, the receiver body 31 is provided with a bottom part 44 having a substantially rectangular shape as viewed from above; left and right raised parts 45, 46 provided at a distal end 44a of the bottom part 44; a left side wall 47 that extends to the rear along the left side of the bottom part 44 from the left raised part 45; a right side wall 48 that extends to the rear along the right side of the bottom part 44 from the right raised part 46; and a decorative cover 49 provided to a proximal end 44b of the bottom part 44.

In the bottom part 44, a front attachment hole 51 is formed in the center in the width direction of the distal end 44a, and a rear attachment hole 52 is formed in the center in the width direction of the proximal end 44b. In the bottom part 44, a recessed part 53 is formed in the rear case half of the bottom part 44, a first depression 54 is formed in front of the recessed part 53, a second depression 55 is formed at the front right end of the first depression 54, and a debris discharge port 56 for discharge is formed at a distal end 55a (i.e., to the rear of the right raised part 46) of the second depression 55.

Since the receiver body 31 is positioned so as to tilt downward toward the front, the distal end 55a of the second depression 55 is at the bottom. The debris discharge port 56 is thus provided in the lowest position of the bottom part 44.

Providing the debris discharge port 56 at the lowest part of the bottom part 44 of the receiver body 31 enables debris (sand, dead leaves, and the like) in the receiver body 31 to easily be discharged from the debris discharge port 56. Maintenance for removing the debris of the receiver body 31 can thereby be facilitated.

The bottom part 44 can also be exposed by removing the gas cylinder case 26 from the receiver body 31. The debris is thereby even easier to remove from the bottom part 44 of the receiver body 31.

A bolt 57 (FIG. 6A) is inserted into each of the front and rear attachment holes 51, 52, and the inserted bolts 57 are attached to the handle column 18 via a bracket 58. The receiver body 31 is thereby fixed to the handle column 18 via the bracket 58 (FIG. 6A). In this state, the upper end part 18a (FIG. 2) of the handle column 18 and the lower end part 23a of the operating handle 23 are covered by the decorative cover 49.

Attachment holes 45a, 46a for fastening together the attachment bracket 32 and the base support/switch valve 33 by a bolt 59 (FIG. 3) are formed in the left and right raised parts 45, 46, respectively.

Figure 4:
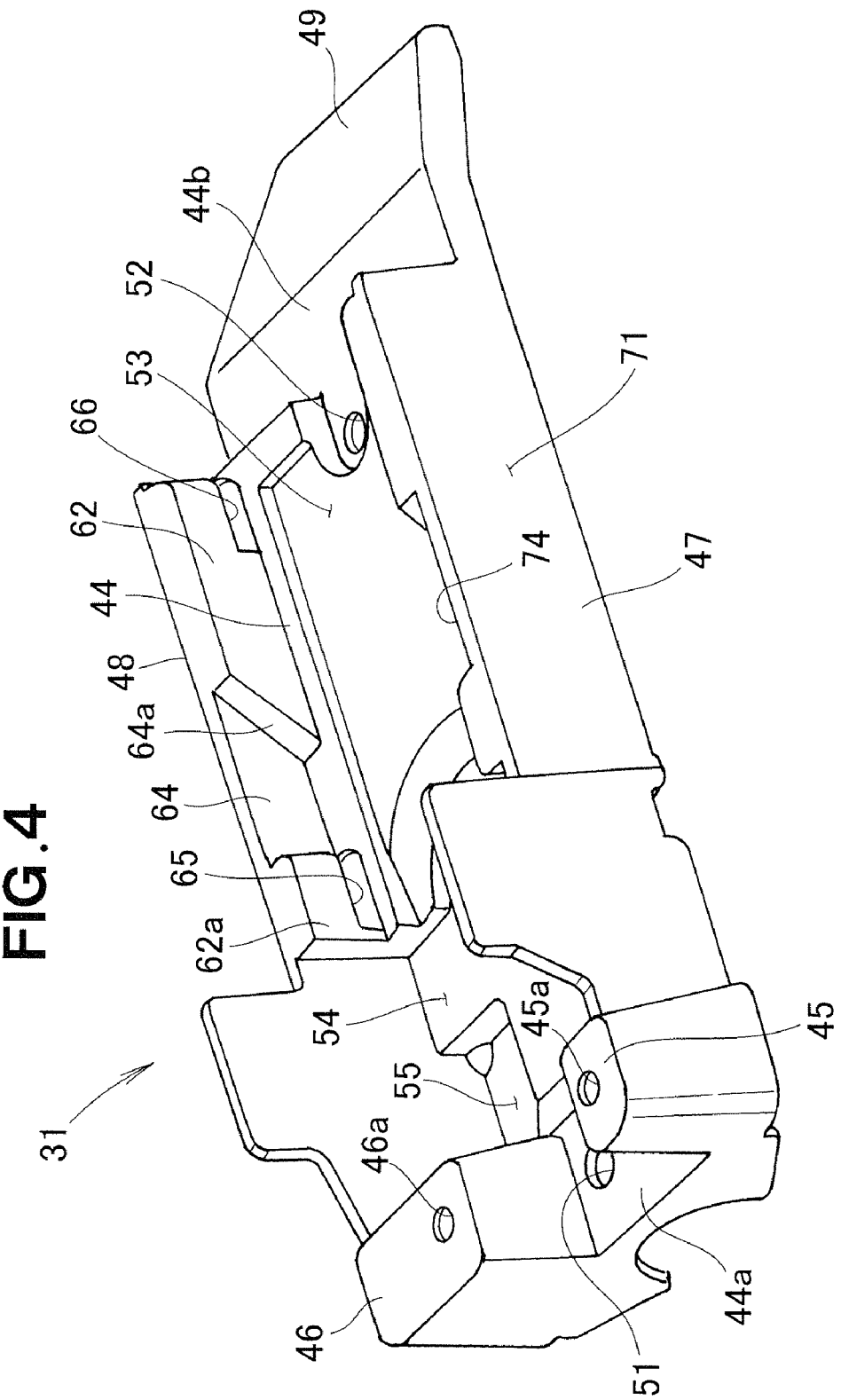
FIG. 4 is a perspective view showing a receiver body of FIG. 3.

As shown in FIG. 6, the rear case half 48a of the right side wall 48 is formed in a cross-sectional U shape by a right outside wall 61, a right inside wall 62, and a right top part 63. As shown in FIG. 4, a right guide groove 64 is formed in a position close to a distal end 62a of the right inside wall 62, a right front slider guide (slider guide) 65 is formed in front of the right guide groove 64, and a right rear slider guide (slider guide) 66 is formed to the rear of (i.e., at a proximal end of the right inside wall 62) the right guide groove 64. The right guide groove 64 has an inclined surface 64a, and the lower part of the right guide groove 64 is connected to the bottom part 44.

As shown in FIG. 6B, the right front slider guide 65 has a lower guide part 65a provided on the right side of the bottom part 44, and an upper guide part 65b formed at the lower end of the right inside wall 62. The lower guide part 65a and the upper guide part 65b are provided a predetermined distance apart. In a state in which a right front slider 82 is inserted into the right front slider guide 65, the right front slider 82 is prevented by the upper guide part 65b from moving away from the bottom part 44. The right front slider 82 is thereby kept in a state of retention in the right front slider guide 65.

As shown in FIG. 6A, the right rear slider guide 66 has a lower guide part 66a provided on the right side of the bottom part 44, and an upper guide part 66b formed at the lower end of the right inside wall 62. The lower guide part 66a and the upper guide part 66b are provided a predetermined distance apart, the same as in the right front slider guide 65. In a state in which a right rear slider 84 is inserted into the right rear slider guide 66, the right rear slider 84 is prevented by the upper guide part 66b from moving away from the bottom part 44. The right rear slider 84 is thereby kept in a state of retention in the right rear slider guide 66.

The left side wall 47 is left-right symmetrical to the right side wall 48.

Specifically, as shown in FIGS. 6A and 6B, the rear case half 47a (FIG. 5) of the left side wall 47 is formed in a cross-sectional U shape by a left outside wall 71, a left inside wall 72, and a left top part 73.

As shown in FIG. 5, a left guide groove 74 is formed in a position close to a distal end 72a of the left inside wall 72, a left front slider guide (slider guide) 75 is formed in front of the left guide groove 74, and a left rear slider guide (slider guide) 76 is formed to the rear of (i.e., at a proximal end of the left inside wall 72) the left guide groove 74.

As shown in FIG. 6B, the left front slider guide 75 has a lower guide part 75a provided on the left side of the bottom part 44, and an upper guide part 75b formed at the lower end of the left inside wall 72. The lower guide part 75a and the upper guide part 75b are provided a predetermined distance apart. In a state in which a left front slider 81 is inserted into the left front slider guide 75, the left front slider 81 is prevented by the upper guide part 75b from moving away from the bottom part 44. The left front slider 81 is thereby kept in a state of retention in the left front slider guide 75.

As shown in FIG. 6A, the left rear slider guide 76 has a lower guide part 76a provided on the left side of the bottom part 44, and an upper guide part 76b formed at the lower end of the left inside wall 72. The lower guide part 76a and the upper guide part 76b are provided a predetermined distance apart, the same as in the left front slider guide 75. In a state in which a left rear slider 83 is inserted into the left rear slider guide 76, the left rear slider 83 is prevented by the upper guide part 76b from moving away from the bottom part 44. The left rear slider 83 is thereby kept in a state of retention in the left rear slider guide 76.

The left and right front slider guides 75, 65 support the left and right front sliders 81, 82 (FIG. 13) of the gas cylinder case 26 so that the left and right front sliders 81, 82 are able to slide toward a base support 37 (FIG. 3).

The left and right rear slider guides 76, 66 support the left and right rear sliders 83, 84 (FIG. 13) of the gas cylinder case 26 so that the left and right rear sliders 83, 84 are able to slide toward the base support 37 (FIG. 3).

The left and right front slider guides 75, 65 and the left and right rear slider guides 76, 66 are thus provided to the receiver body 31, and the left and right front sliders 81, 82 and left and right rear sliders 83, 84 are provided to the gas cylinder case 26. The left and right front sliders 81, 82 are supported by the left and right front slider guides 75, 65, and the left and right rear sliders 83, 84 are supported by the left and right rear slider guides 76, 66. The left and right front sliders 81, 82 and the left and right rear sliders 83, 84 can thus be slid toward the base support 37 (FIG. 3) without being lifted from the receiver body 31. The gas cylinder case 26 (cassette gas cylinder 21) can thereby be positioned in the predetermined attachment position by the simple procedure of merely sliding the left and right front sliders 81, 82 and the left and right rear sliders 83, 84. The gas cylinder case 26 is thereby easily attached (positioned).

Furthermore, the gas cylinder case 26 can be securely fixed in place by inserting the left and right front sliders 81, 82 or the left and right rear sliders 83, 84 in the left and right front slider guides 75, 65 or the left and right rear slider guides 76, 66. Vibration of the gas cylinder case 26 can thereby be further suppressed.

The procedure for detachably attaching the gas cylinder case 26 to the receiver body 31 will be described in detail using FIGS. 17 and 18.

Figure 7:
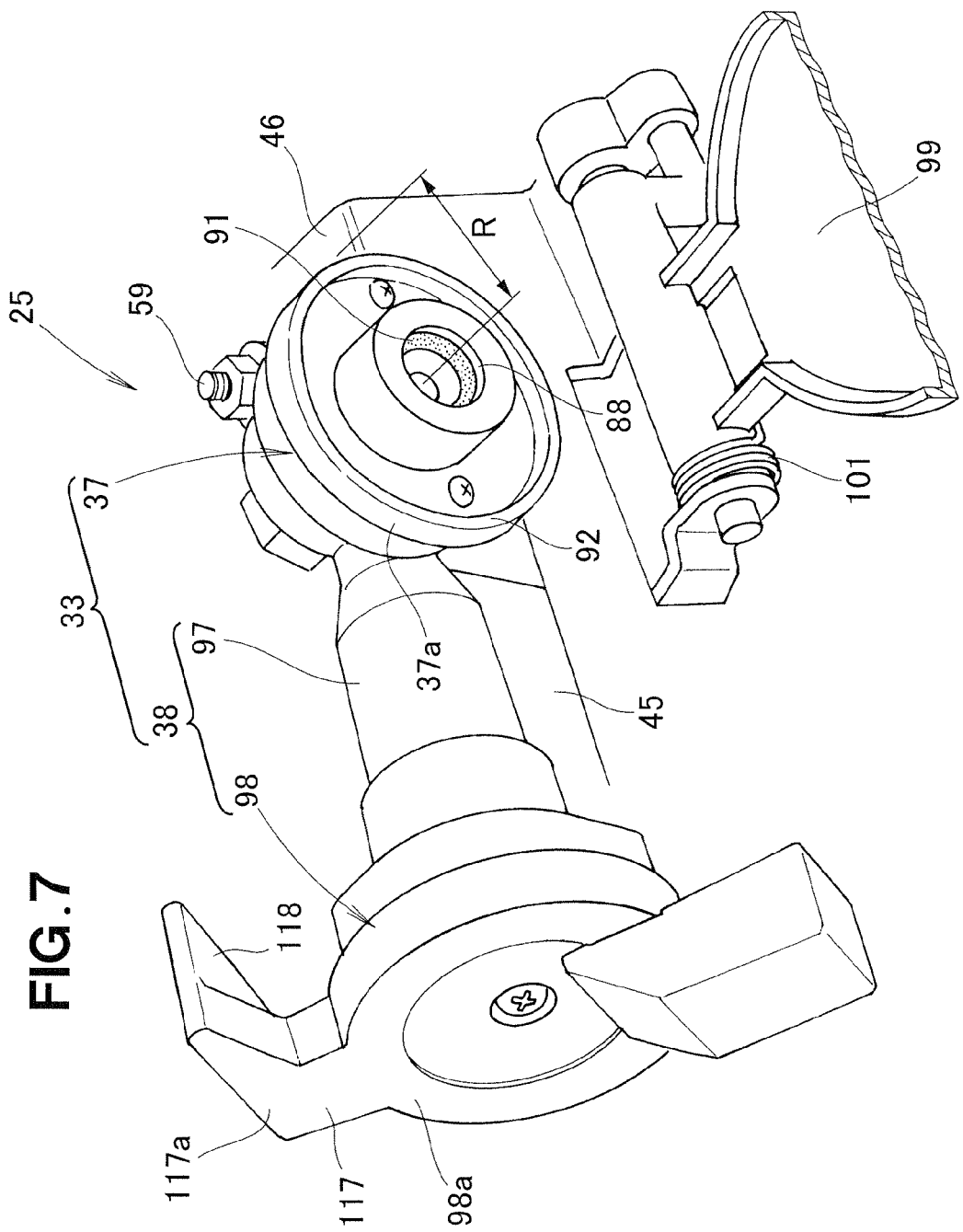
FIG. 7 is a perspective view showing a switch valve and a base support of the receiver.
Figure 8:
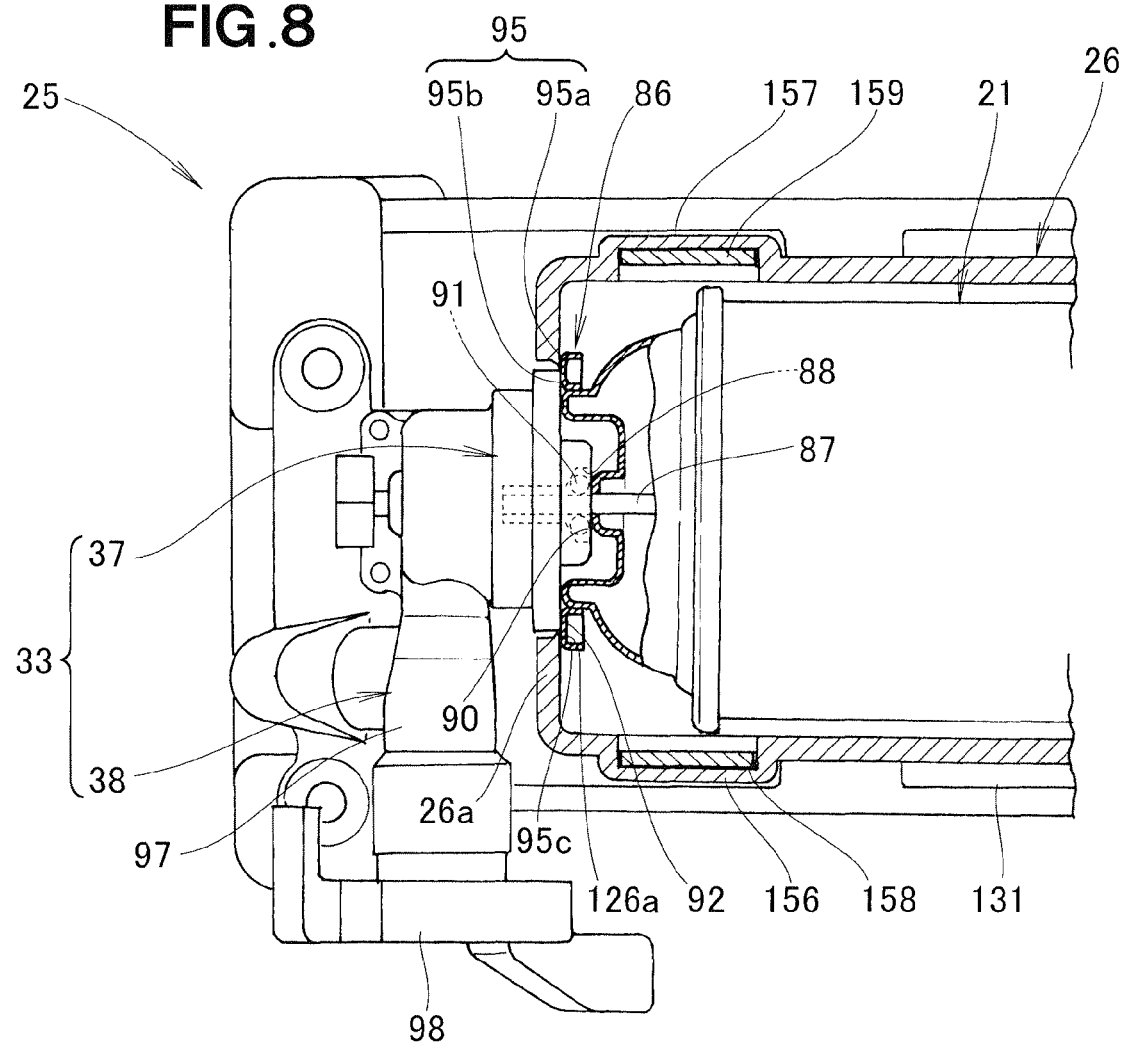
FIG. 8 is a cross-sectional view showing the base of the cassette gas cylinder being supported by the base support of the receiver.

As shown in FIGS. 7 and 8, the base support/switch valve 33 of the receiver 25 is a member in which the base support 37 and the switch valve 38 are integrally formed, and is attached to the left and right raised parts 45, 46 by a pair of bolts 59 (only one of which is shown in the drawing).

The base support 37 supports a base 86 of the cassette gas cylinder 21. In the base support 37, a nozzle accommodating depression 88 for accepting a nozzle 87 of the cassette gas cylinder 21 is provided concentrically with the base support 37, an O-ring 91 for contacting a seat part 90 of the cassette gas cylinder 21 is provided inside the nozzle accommodating depression 88, and a flange receiving part 92 is provided concentrically with the nozzle accommodating depression 88.

The seat part 90 of the cassette gas cylinder 21 is brought into contact with the O-ring 91 by attaching the gas cylinder case 26 in which the cassette gas cylinder 21 is accommodated to the receiver 25. The seat part 90 is in contact with the O-ring 91, and the O-ring 91 thereby maintains a seal around the nozzle 87.

The flange receiving part 92 is a ring-shaped receiving part formed along tan external peripheral wall 37a of the base support 37. The flange receiving part 92 is formed along the external peripheral wall 37a, and the radius R of the flange receiving part 92 is thereby kept relatively large.

The flange receiving part 92 is in contact with a flange 95 of the cassette gas cylinder 21 when the cassette gas cylinder 21 is set on the base support 37. The flange 95 is a collar part having a relatively large radius that is formed along the external periphery of the base 86. The flange 95 of the cassette gas cylinder 21 makes contact with the flange receiving part 92 that has a relatively large radius R, and the cassette gas cylinder 21 is thereby reliably supported by the flange receiving part 92.

In the switch valve 38, a cock body 97 formed integrally with the base support 37, and a valve body (not shown) inside the cock body 97 are provided, and an operating lever 98 is provided to the valve body. By placing the operating lever 98 in the fuel feeding position P3 (see FIG. 2), the valve body is positioned so as to open a flow channel inside the cock body 97. The switch valve 38 is thus maintained in the fuel feeding state of feeding fuel 24 (see FIG. 10) to the gas engine 12 shown in FIG. 1.

By placing the operating lever 98 in the fuel cutoff position P4 (see FIG. 3), the valve body is positioned so as to close the flow channel inside the cock body 97. The switch valve 38 is thus maintained in the fuel cutoff state of stopping the supply of fuel 24 to the gas engine 12.

The receiver 25 is provided with a shutter member 99 for blocking the base support 37. The shutter member 99 blocks the base support 37 by the urging force of a spring member 101 when the cassette gas cylinder 21 is detached from the receiver 25.

As shown in FIGS. 2 and 3, the case retaining means 34 of the receiver 25 has the retaining rod (retaining member) 41 provided to the attachment bracket 32 so as to be able to rotate, a base cover 104 provided to the retaining rod 41, and a locking spring member 105 for keeping the retaining rod 41 in the retention position P1.

The proximal ends of left and right legs 106, 107 of the retaining rod 41 are each rotatably supported by the attachment bracket 32, left and right hook parts 108, 109 extend from the distal ends 106a, 107a of the left and right leg parts 106, 107, respectively, and the distal ends 108a, 109a of the left and right hook parts 108, 109 are connected to each other by a grip part 111.

The base cover 104 is provided so as to extend to the proximal ends of the left and right legs 106, 107, and covers the base 86 or the vicinity of the base 86 of the cassette gas cylinder 21.

The locking spring member 105 is a coil spring for keeping the retaining rod 41 in the retention position P1, and is fastened to the attachment bracket 32 and the proximal end of the right leg 107.

The left and right legs 106, 107 are positioned on the outside of the gas cylinder case 26.

The left and right hook parts 108, 109 extend toward the center from the outside of the gas cylinder case 26. Having the left and right hook parts 108, 109 extend toward the center enables the hook parts 108, 109 to latch onto the latching part 42 of the gas cylinder case 26. Latching the hook parts 108, 109 onto the latching part 42 of the gas cylinder case 26 make it possible to prevent the gas cylinder case 26 from moving to the rear.

Figure 13:
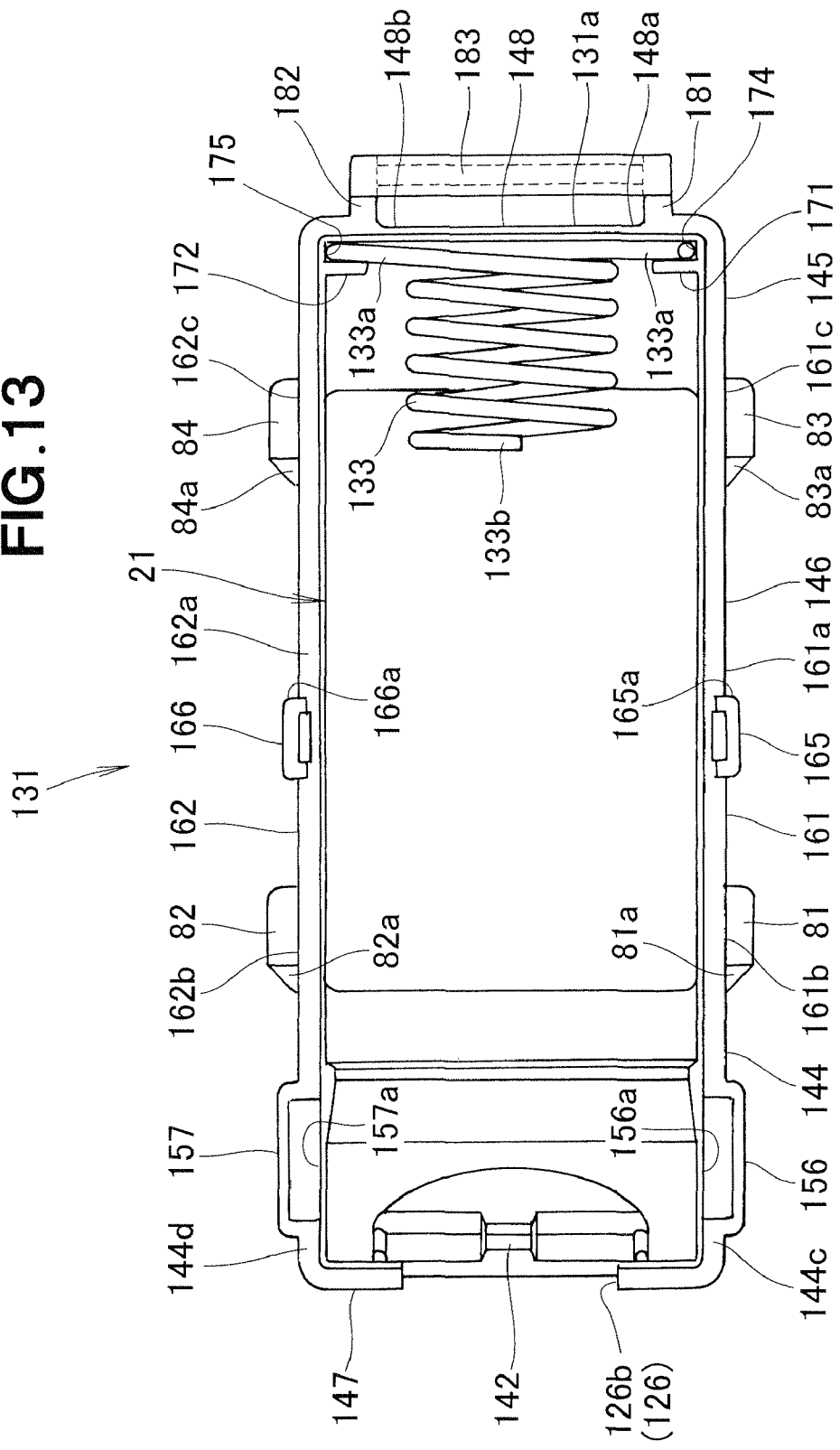
FIG. 13 is a view showing the lower case half as seen in the direction of arrow 13 of FIG. 11.

Specifically, a state can be maintained in which the left and right front sliders 81, 82 shown in FIG. 13 are retained in the left and right front slider guides 75, 65 (see FIG. 6), and the left and right rear sliders 83, 84 shown in FIG. 13 are retained in the left and right rear slider guides 76, 66 (see FIG. 6). Attachment of the gas cylinder case 26 to the receiver 25 can thereby be maintained.

Latching the retaining rod 41 onto the latching part 42 enables the gas cylinder case 26 to be urged toward the flange receiving part 92 (see also FIG. 7) of the base support 37 by the retaining rod 41. By thus urging the gas cylinder case 26 toward the flange receiving part 92, the flange 95 of the cassette gas cylinder 21 can be brought into contact with the flange receiving part 92. The cassette gas cylinder 21 can thus be reliably retained by the flange receiving part 92. The cassette gas cylinder 21 accommodated in the gas cylinder case 26 can thereby be stably supported.

In this state, the seat part 90 of the cassette gas cylinder 21 is appropriately in contact with the O-ring 91, as shown in FIG. 8. A seal around the nozzle 87 is ensured by the O-ring 91 by the seat part 90 being appropriately in contact with the O-ring 91.

In the state in which the retaining rod 41 is latched onto the latching part 42, the distal end 26a of the gas cylinder case 26 is not in contact with the base support 37, as shown in FIG. 8. The distal end 26a of the gas cylinder case 26 is thus maintained in a free state, being unrestrained by the base support 37. The gas cylinder case 26 can thereby be moved until the flange 95 of the cassette gas cylinder 21 is in contact with the flange receiving part 92. Consequently, the flange 95 of the cassette gas cylinder 21 can be reliably brought into contact with the flange receiving part 92.

The latching part 42 of the gas cylinder case 26 will later be described in detail.

As shown in FIG. 3, the grip part 111 is formed to enable an operator to grasp the grip part 111 by hand. The grip part 111 can be grasped by hand, and the retaining rod 41 can be pulled from the retention position P1 to the released position P2 against the urging force of the locking spring member 105.

The valve coupling means 35 of the receiver 25 has a driven protrusion 114 that protrudes from the operating lever 98, and a driving contactor (driving protrusion) 116 provided to a left edge 104a of the base cover 104.

The driven protrusion 114 is provided with a substantially L-shaped region 117 that extends upward from the upper end 98a of the operating lever 98, and a driven latch piece 118 (see also FIG. 7) that extends in overhanging fashion toward the retaining rod 41 from the distal end 117a (see FIG. 7) of the L-shaped region 117.

The driving contactor 116 is provided with an overhang piece 121 that extends in overhanging fashion from the left edge of the base cover 104 to the outside (to the side of the operating lever 98), and a driving latch piece 122 that extends along the left leg 106 from the overhang piece 121 to the driven latch piece 118. The overhang piece 121 and the driving latch piece 122 are formed so as to be able to make contact with the driven latch piece 118 of the operating lever 98.

By the valve coupling means 35, the driven latch piece 118 makes contact with the driving latch piece 122 when the operating lever 98 is switched to the fuel feeding position P3 in a state in which the cassette gas cylinder 21 is retained by the retaining rod 41, as shown in FIGS. 2 and 3.

When the retaining rod 41 is moved from this state in the direction of the released position P2 in which retention of the cassette gas cylinder 21 is released, the driven latch piece 118 is moved by the driving contactor 116 (driving latch piece 122 or overhang piece 121), and the operating lever 98 is made to move in coupled fashion to the fuel cutoff position P4.

Specifically, the switch valve 38 can be switched from the fuel feeding state to the fuel cutoff state in conjunction with the movement of the retaining rod 41 when retention of the cassette gas cylinder 21 by the case retaining means 34 is released. Since there is thus no need to operate the switch valve 38 individually to switch to the fuel cutoff state when the gas cylinder case 26 is removed from the receiver body 31, the gas cylinder case 26 can be removed by a simple sequence of operations.

In starting the gas engine 12, the operator moves the operating lever 98 from the fuel cutoff position P4 to the fuel feeding position P3 and switches the switch valve 38 to the fuel feeding state. Operator awareness during startup of the gas engine 12 can thereby be increased.

The gas cylinder case 26 will next be described based on FIGS. 9 through 16.

Figure 9:
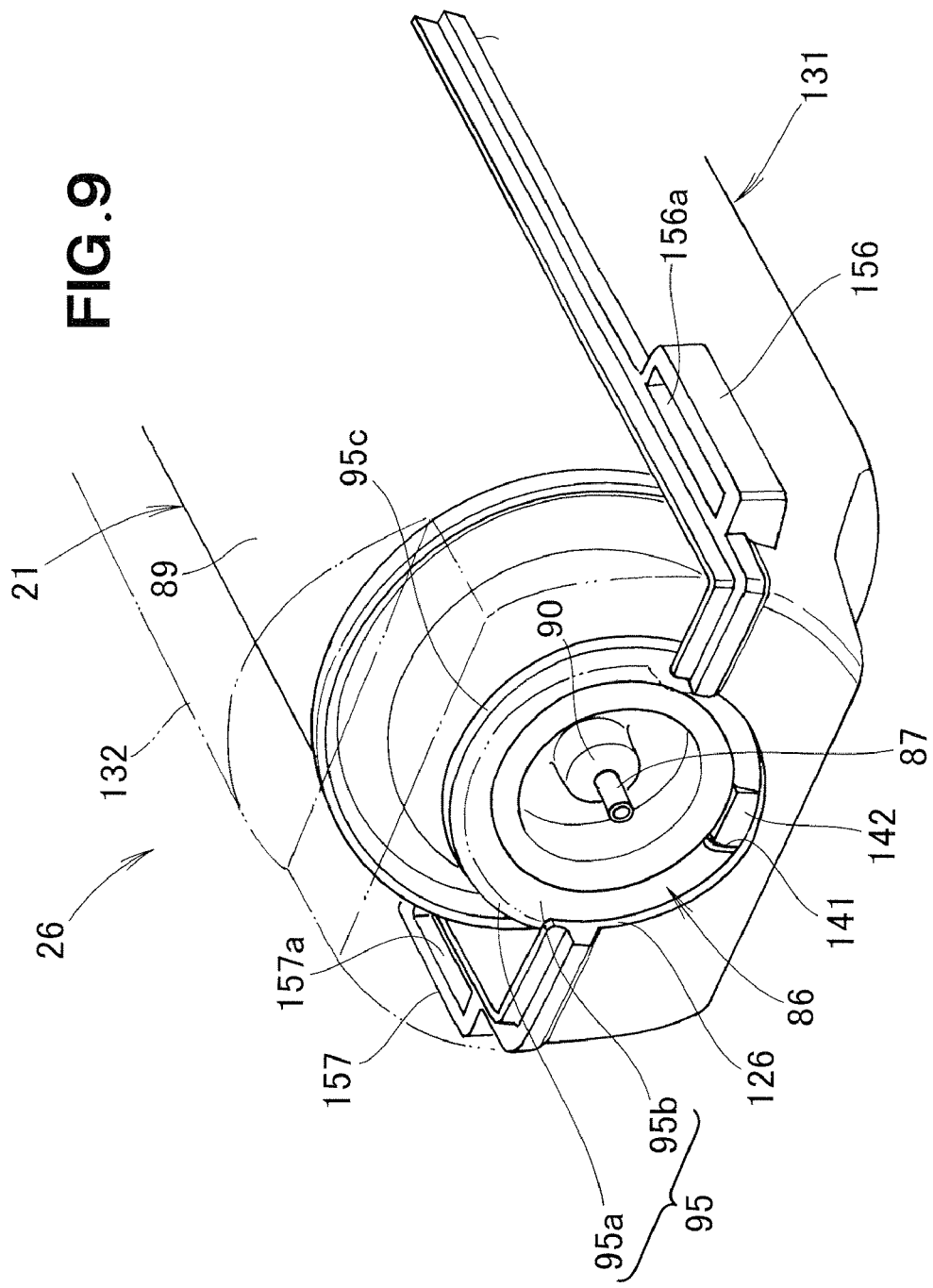
FIG. 9 is a perspective view showing a relationship between the cassette gas cylinder and a lower case half of the gas cylinder case.
Figure 10:
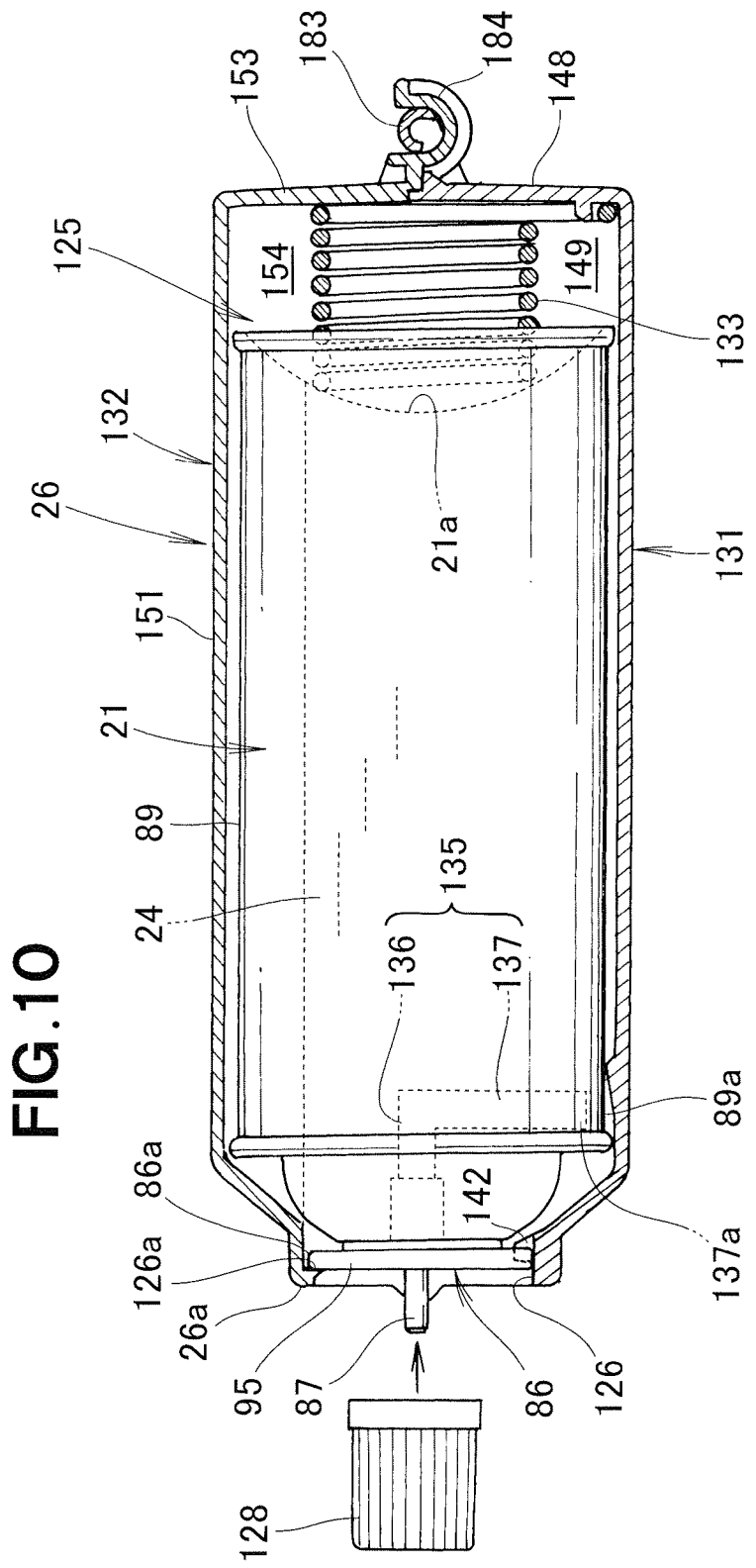
FIG. 10 is a cross-sectional view showing the gas cylinder case with the cassette gas cylinder accommodated therein.
Figure 11:
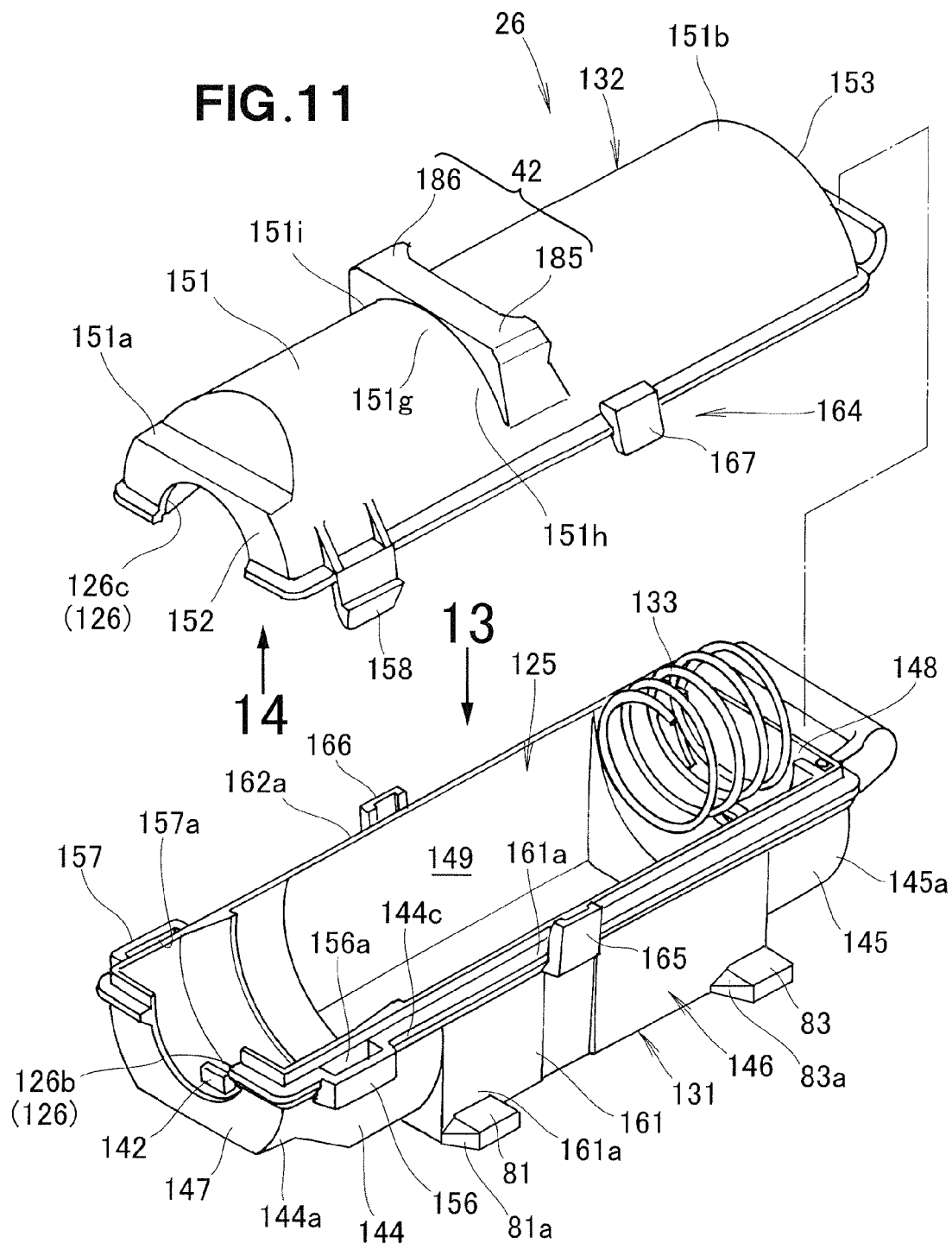
FIG. 11 is an exploded perspective view showing the gas cylinder case of FIG. 10.

As shown in FIGS. 9 through 11, the gas cylinder case 26 can be detachably attached to the receiver 25 in a state in which the cassette gas cylinder 21 is accommodated in an internal space 125. The gas cylinder case 26 is provided with an opening 126 at the distal end 26a thereof. The opening 126 exposes the base 86 of the cassette gas cylinder 21 to the outside.

Having the base 86 exposed to the outside from the opening 126 as shown in FIG. 10 enables a cap 128 to be attached to and detached from the cassette gas cylinder 21 when the cassette gas cylinder 21 is accommodated in the gas cylinder case 26. The ability to attach and detach the cap 128 from the cassette gas cylinder 21 while the cassette gas cylinder 21 is accommodated in the gas cylinder case 26 enables ease of use to be increased.

The gas cylinder case 26 is composed of a lower case half 131 detachably provided to the receiver body 31 (FIG. 3), and an upper case half 132 assembled with the lower case half 131. A coil spring (elastic member) 133 is provided to the lower case half 131. The coil spring 133 urges the cassette gas cylinder 21 toward the opening 126.

As shown in FIG. 11, a lower front peripheral wall 144 and a lower rear peripheral wall 145 of the lower case half 131 are each formed substantially semicircular in cross-section, and a lower central peripheral wall 146 is formed substantially in a U shape in cross-section.

Figure 15:
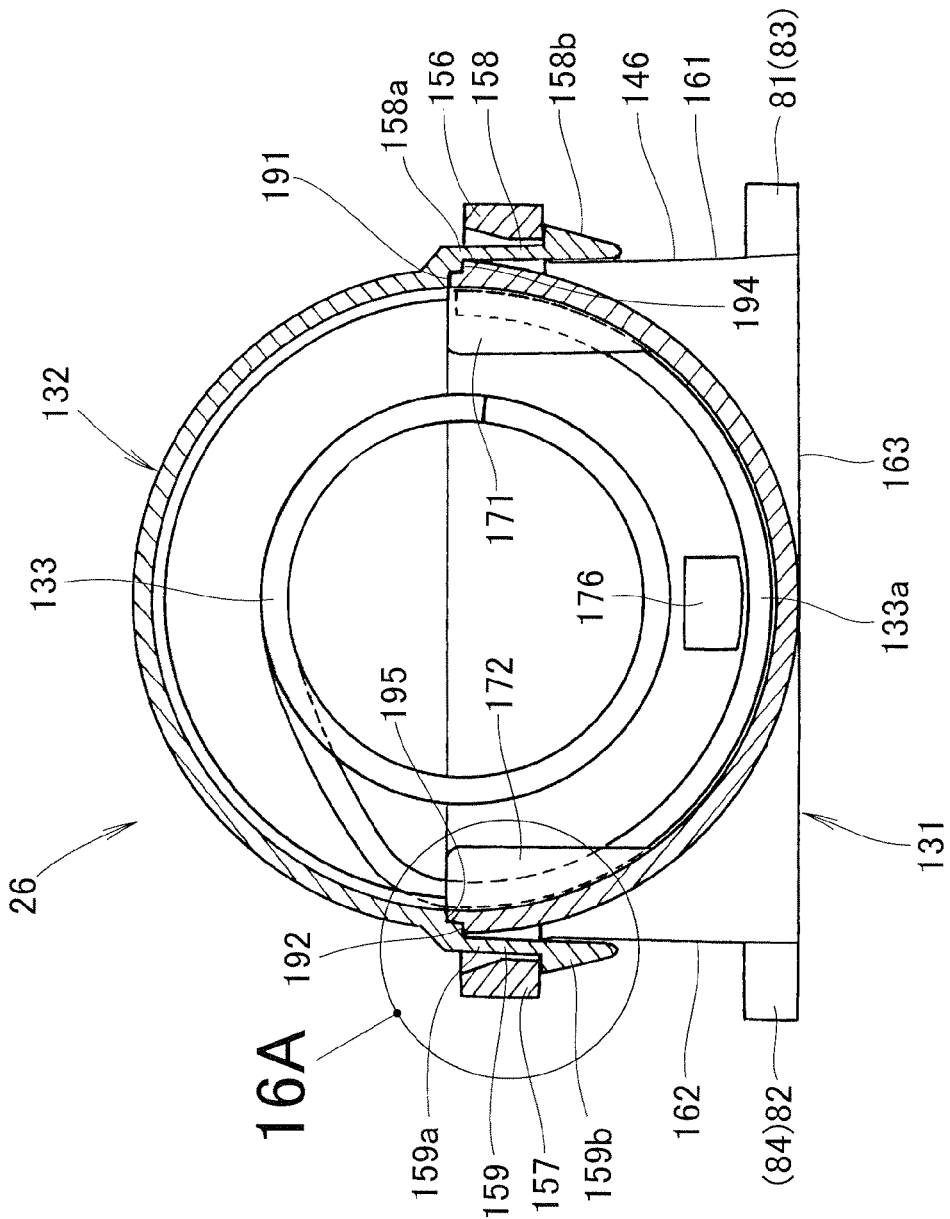
FIG. 15 is a cross-sectional view taken along line 15-15 of FIG. 3.

The lower central peripheral wall 146 is formed substantially in a cross-sectional U shape by left and right side wall portions 161, 162 and a bottom part 163 (see FIG. 15).

A lower front wall 147 is provided to the distal end 144*a* of the lower front peripheral wall 144. A lower rear wall 148 is provided to the proximal end 145*a* of the lower rear peripheral wall 145.

A lower space 149 open at the top thereof is formed by the lower front peripheral wall 144, the lower rear peripheral wall 145, the lower central peripheral wall 146, the lower front wall 147, and the lower rear wall 148. The lower space 149 is a space for accommodating the lower half of the cassette gas cylinder 21.

In the upper case half 132, an upper peripheral wall 151 is formed substantially semicircular in cross-section, an upper front wall 152 is provided to the distal end 151*a* of the upper peripheral wall 151, and an upper rear wall 153 is provided to the proximal end 151*b* of the upper peripheral wall 151. An upper space 154 (FIG. 10) open at the bottom thereof is formed by the upper peripheral wall 151, the upper front wall 152, and the upper rear wall 153. The upper space 154 is a space for accommodating the upper half of the cassette gas cylinder 21.

The gas cylinder case 26 is formed by assembling the upper case half 132 with the lower case half 131. The internal space 125 of the gas cylinder case 26 is thereby formed by the lower space 149 and the upper space 154.

The cassette gas cylinder 21 is accommodated in the inside (internal space 125) of the gas cylinder case 26 that is composed of the upper case half 132 and the lower case half 131. In this state, an external peripheral part 95*c* (see also FIG. 8) of the flange 95 provided to the cassette gas cylinder 21 is clamped from the top and bottom directions by the lower case half 131 and the upper case half 132.

The cassette gas cylinder 21 is a commercially available gas cylinder in which a vessel 89 is filled with liquefied butane (liquid fuel gas) 24 primarily composed of butane. In the cassette gas cylinder 21, the base 86 is provided at the distal end of the vessel 89, the nozzle 87 protrudes from the center of the base 86, and a substantially L-shaped introduction tube 135 is provided inside the vessel 89.

Pressing the nozzle 87 toward the vessel 89 causes the liquid fuel 24 stored in the vessel 89 to be guided from the introduction tube 135 to the nozzle 87 and drawn to the outside from the nozzle 87. The introduction tube 135 is formed substantially in an L shape by a first introduction tube part 136 that extends concentrically with the nozzle 87, and a second introduction tube part 137 that extends downward in the substantially orthogonal direction from the end of the first introduction tube part 136. The second introduction tube part 137 is extended downward, and an introduction port 137*a* of the second introduction tube part 137 is thereby positioned in the vicinity of a front lower peripheral wall 89*a* of the vessel 89.

The flange 95 is formed on the external periphery 86*a* of the base 86, and a cut-out part 141 is formed in the flange 95. The cut-out part 141 is formed so as to be able to engage with a positioning protrusion 142. The positioning protrusion 142 is formed in the inside (i.e., the inside in the vicinity of the opening 126) of the gas cylinder case 26. The cut-out part 141 is engaged with the positioning protrusion 142 when the cassette gas cylinder 21 is accommodated in the gas cylinder case 26. The cassette gas cylinder 21 can thereby be easily positioned in the proper attachment position, in which the introduction port 137*a* of the second introduction tube part 137 faces downward.

The cassette gas cylinder 21 is positioned so that the front lower peripheral wall 89*a* of the vessel 89 is on the bottom when attached to the work machine 10. The introduction port 137*a* of the second introduction tube part 137 is thus positioned in the vicinity of the front lower peripheral wall 89*a* of the vessel 89, and it is thereby possible all of the fuel 24 in the vessel 89 to be taken into the introduction port 137*a*. The fuel 24 in the vessel 89 can thereby be completely used without any fuel 24 remaining in the vessel 89.

The gas cylinder case 26 is composed of the upper case half 132 and the lower case half 131, and the external peripheral part 95*c* of the flange 95 is clamped from the top and bottom directions by the upper and lower case halves 132, 131. Assembly of the upper and lower case halves 132, 131 is thus prevented by the flange 95 when the cut-out part 141 is not engaged with the positioning protrusion 142, for example, and the flange 95 is not positioned (set) in the predetermined position. It is thereby possible to reliably prevent the cassette gas cylinder 21 from being accommodated in the gas cylinder case 26 without the cassette gas cylinder 21 being set in the predetermined position.

The flange 95 has an external peripheral portion 95*a* capable of making contact with a peripheral edge 126*a* of the opening 126 provided to the gas cylinder case 26, and an internal peripheral portion 95*b* capable of making contact with the flange receiving part 92 (see FIG. 7) of the base support 37. The cassette gas cylinder 21 can be held inside the gas cylinder case 26 by the external peripheral portion 95*a* of the flange 95 making contact with the peripheral edge 126*a* of the opening 126.

The internal peripheral portion 95*b* of the flange 95 makes contact with the flange receiving part 92 (see FIG. 7) of the base support 37. A relatively large radius R (see FIG. 7) is maintained in the flange receiving part 92. As previously mentioned, the flange 95 of the cassette gas cylinder 21 makes contact with the flange receiving part 92, and the cassette gas cylinder 21 is thereby reliably supported by the flange receiving part 92. The cassette gas cylinder 21 can thereby be prevented from being shaken by the vibration of the work machine 10 (see FIG. 1), and the cassette gas cylinder 21 can be stably supported by the flange receiving part 92.

Figure 12:
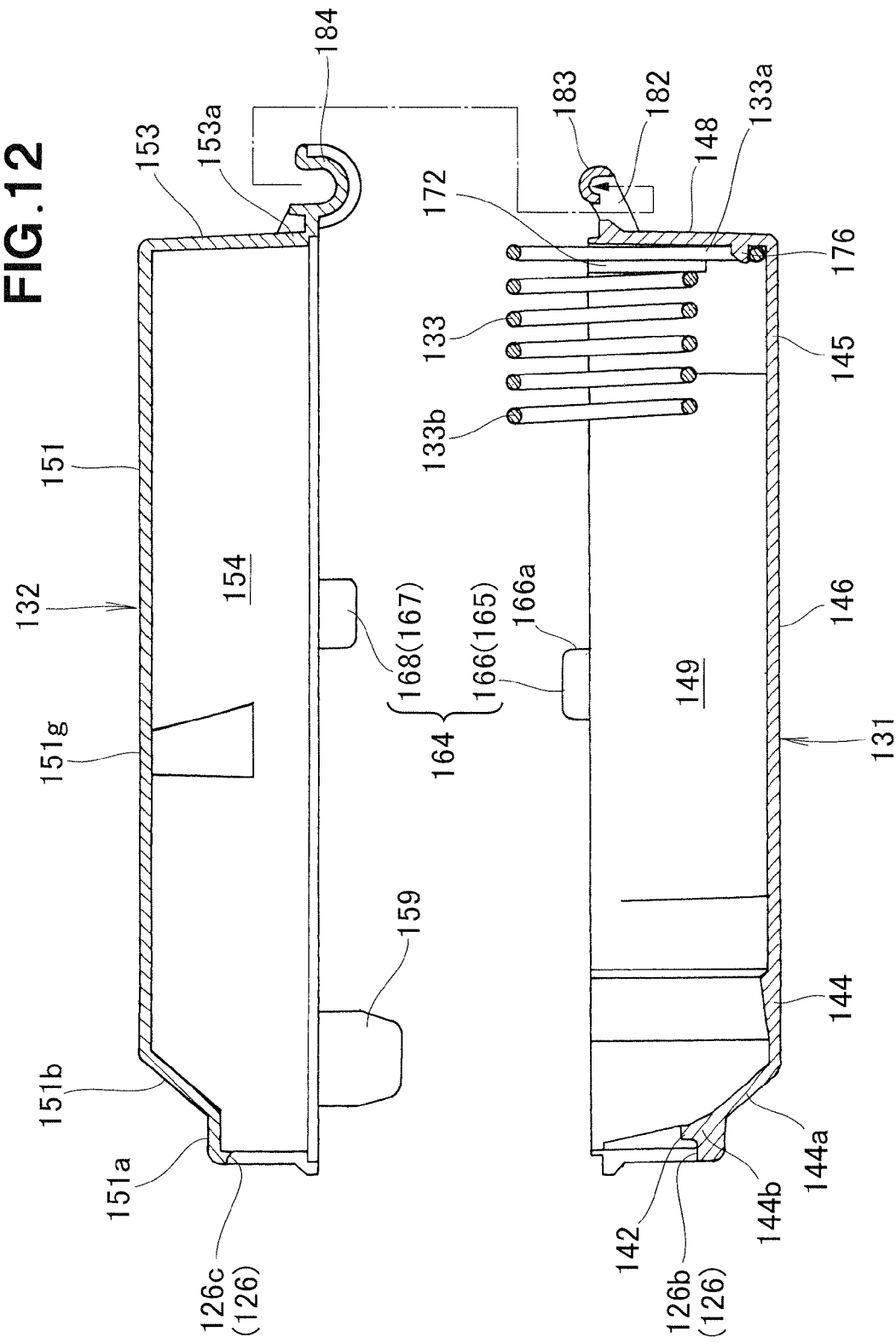
FIG. 12 is a cross-sectional view showing the gas cylinder case of FIG. 11.
Figure 14:
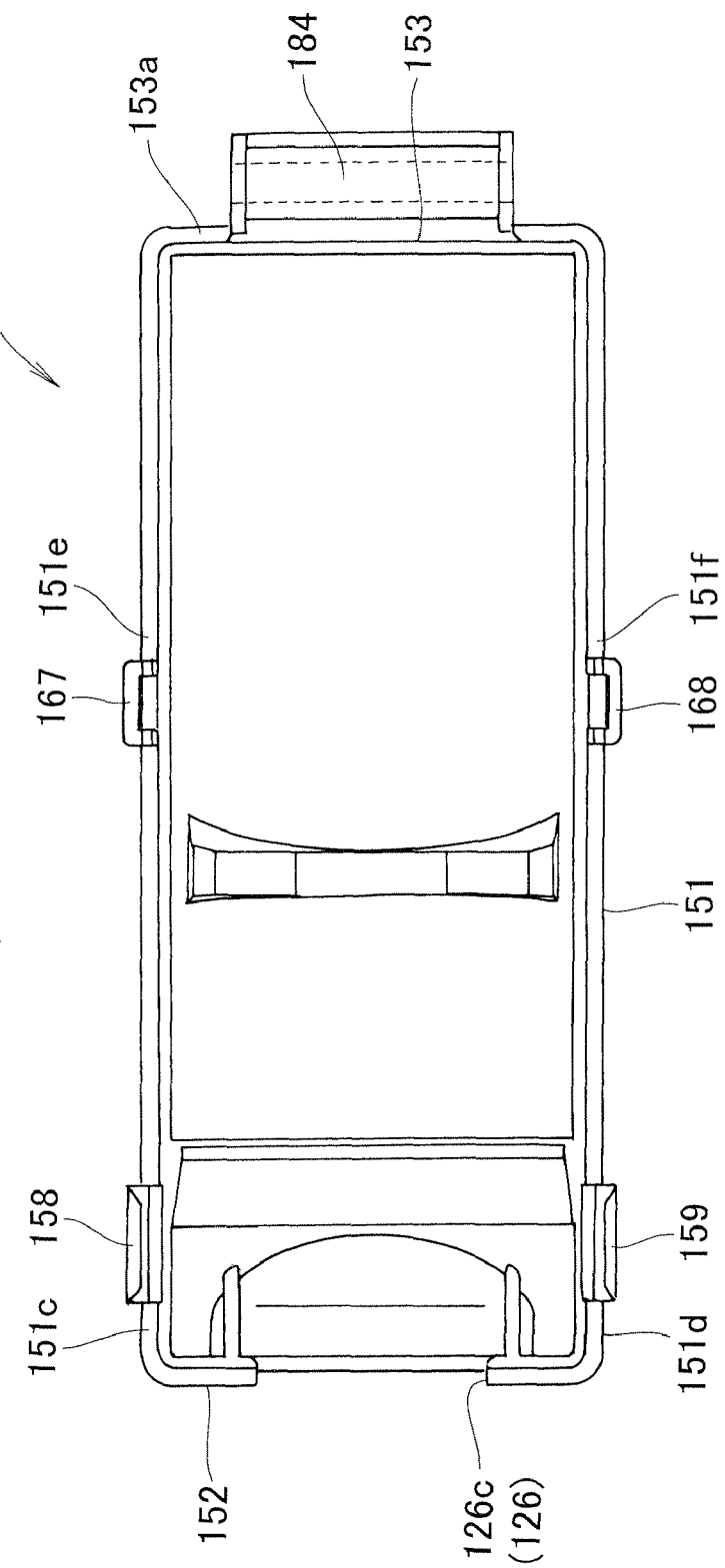
FIG. 14 is a view showing the upper case half as seen in the direction of arrow 14 of FIG. 11.

As shown in FIGS. 12, 13, and 14, the bottom of the lower front peripheral wall 144 in the lower case half 131 is formed so that the distal end 144*a* slopes upward toward the front. The positioning protrusion 142 protrudes upward in the center of the peak 144*b* of the upwardly sloping distal end 144*a*. The cut-out part 141 (see FIG. 9) of the flange 95 engages with the positioning protrusion 142. Engaging the cut-out part 141 with the positioning protrusion 142 enables the cassette gas cylinder 21 to be positioned in the proper attachment position, so that the introduction port 137*a* of the second introduction tube part 137 faces downward.

In the lower case half 131 as shown in FIG. 13, a left locking tab receiver 156 is provided to a left peripheral edge distal end 144*c* on the external surface of the lower front peripheral wall 144. Also on the external surface of the lower front peripheral wall 144, a right locking tab receiver 157 is provided to a right peripheral edge distal end 144*d*.

The left and right locking tab receivers 156, 157 have latch holes 156*a*, 157*a*, respectively, formed therein for accepting left and right locking tabs 158, 159 (FIG. 14) that are provided to the upper case half 132. The left locking tab 158 can be latched in the left locking tab receiver 156 by inserting the left locking tab 158 into the latch hole 156*a* of the left locking tab receiver 156. The right locking tab 159 can also be latched in the right locking tab receiver 157 by inserting the right locking tab 159 into the latch hole 157*a* of the right locking tab receiver 157. The lower case half 131 and the upper case half 132 are thereby maintained in an assembled state.

As shown in FIG. 11, a left side wall 161 of the lower central peripheral wall 146 is formed in a substantially rectangular shape as viewed from the side, and a right side wall 162 is formed symmetrical to the left side wall 161. A left stopper 165 is provided to a left peripheral edge center part 161*a* on the external surface of the left side wall 161, and a right stopper 166 is provided to a right peripheral edge center part 162*a* on the external surface of the right side wall 162.

The left and right stoppers 165, 166 are provided with rear walls 165*a*, 166*a* that are capable of coming in contact with left and right latching parts 167, 168 (FIG. 14), respectively, that are provided to the upper case half 132.

The left and right stoppers 165, 166 and the left and right latching parts 167, 168 constitute a misalignment prevention means 164.

The misalignment prevention means 164 is capable of preventing the upper case half 132 from being misaligned in the longitudinal direction (toward the front) with respect to the lower case half 131 in the state in which the retaining rod 41 (see FIG. 3) is latched onto the latching part 42.

The misalignment prevention means 164 is composed of the left and right stoppers 165, 166 of the lower case half 131, and the left and right latching parts 167, 168 of the upper case half 132. The upper and lower case halves 132, 131, i.e., the gas cylinder case 26, can thereby be satisfactorily retained by the simple structure made up of the left and right stoppers 165, 166 and the left and right latching parts 167, 168.

Left and right projections 171, 172 are formed at the proximal end on the internal surface of the lower rear peripheral wall 145. The left and right projections 171, 172 are formed at a predetermined distance from the lower rear wall 148. A left fitting groove 174 is thus formed by the left projection 171 and the lower rear wall 148, and a right fitting groove 175 is formed by the right projection 172 and the lower rear wall 148.

A proximal end 133*a* of the coil spring 133 is fitted in the left and right fitting grooves 174, 175. The proximal end 133*a* is in contact with a retaining protrusion 176. The proximal end 133*a* is thus prevented by the retaining protrusion 176 from coming out of the left and right fitting grooves 174, 175. The retaining protrusion 176 is formed on the internal surface of the lower rear wall 148.

The proximal end 133*a* of the coil spring 133 is thus fitted in the left and right fitting grooves 174, 175, and the proximal end 133*a* is retained by the retaining protrusion 176. The coil spring 133 can thereby be provided inside the gas cylinder case 26 by a simple structure. Specifically, the proximal end 133*a* of the coil spring 133 is provided to a proximal end 131*a* (proximal end of the gas cylinder case 26) of the lower case half 131, and a distal end 133*b* of the coil spring 133 pushes against a bottom part 21*a* (see FIG. 10) of the cassette gas cylinder 21, and the cassette gas cylinder 21 is thereby urged toward the opening 126.

As shown in FIG. 10, the cassette gas cylinder 21 is urged by the coil spring 133, whereby the flange 95 is brought to face the opening 126, and a state in which the flange 95 is exposed to the outside is reliably maintained.

Furthermore, the cassette gas cylinder 21 is urged by the coil spring 133, whereby the cassette gas cylinder 21 is prevented from being shaken by the vibration of the work machine 10, and the cassette gas cylinder 21 can be stably supported.

Furthermore, on the external surfaces of the left and right side wall portions 161, 162 of the lower case half 131, the left and right front sliders 81, 82 extend to the outside at lower distal ends 161*b*, 162*b*. The left and right front sliders 81, 82 are formed flush with the bottom part 163 (see FIG. 15) of the lower central peripheral wall 146.

The left and right front sliders 81, 82 are tapered so that the width dimensions of the distal ends 81*a*, 82*a* thereof gradually decrease toward the distal ends, and as shown in FIG. 11, the left and right front sliders 81, 82 are tapered so that the thickness dimensions of the distal ends 81*a*, 82*a* thereof gradually decrease toward the distal ends.

On the external surfaces of the left and right side wall portions 161, 162, the left and right rear sliders 83, 84 extend to the outside at lower proximal ends 161*c*, 162*c*.

The left and right rear sliders 83, 84 are formed so as to have the same shape as the left and right front sliders 81, 82. Specifically, the left and right rear sliders 83, 84 are formed flush with the bottom part 163 (see FIG. 15) of the lower central peripheral wall 146.

The left and right rear sliders 83, 84 are tapered so that the width dimensions of the distal ends 83*a*, 84*a* thereof gradually decrease toward the distal ends, and as shown in FIG. 11, the left and right rear sliders 83, 84 are tapered so that the thickness dimensions of the distal ends 83*a*, 84*a* thereof gradually decrease toward the distal ends.

The left and right front sliders 81, 82 are protruding tabs that can be slidably inserted into the left and right front slider guides 75, 65 provided to the receiver body 31 shown in FIG. 6. The left and right rear sliders 83, 84 are protruding tabs that can be slidably inserted into the left and right rear slider guides 76, 66 provided to the receiver body 31 shown in FIG. 6A. The lower case half 131 is detachably provided to the receiver body 31 by inserting the left and right front sliders 81, 82 into the left and right front slider guides 75, 65 and inserting the left and right rear sliders 83, 84 into the left and right rear slider guides 76, 66.

As previously mentioned, the distal ends 81*a*, 82*a* of the left and right front sliders 81, 82, or the distal ends 83*a*, 84*a* of the rear sliders 83, 84 are tapered. The left and right front sliders 81, 82 or the left and right rear sliders 83, 84 can thus be smoothly inserted into the left and right front slider guides 75, 65 or the left and right rear slider guides 76, 66 of the receiver body 31 shown in FIGS. 6A and 6B.

A semicircular lower half opening 126*b* (see also FIG. 11) that opens upward is formed in the center in the vehicle width direction of the lower front wall 147. The opening 126 (see FIGS. 9 and 10) is formed by assembly of the lower half opening 126*b* with an upper half opening 126*c* (see also FIG. 11) of the upper case half 132.

Left and right support fins 181, 182 are provided to left and right ends 148*a*, 148*b* of the peripheral edge of the lower rear wall 148, and a hinge rod 183 extends between the left and right support fins 181, 182. The hinge rod 183 is provided at a predetermined distance from the lower rear wall 148, and is provided parallel to the lower rear wall 148.

A hinge support 184 formed in the upper case half 132 is rotatably connected to the hinge rod 183. In a state in which the hinge support 184 and the hinge rod 183 of the upper and lower case halves 131, 132 are connected, the upper case half 132 opens and closes with respect to the lower case half 131 about the axis of the hinge rod 183.

The peak 151*b* of the distal end 151*a* of the upper peripheral wall 151 in the upper case half 132 is formed so as to slope downward toward the distal end as shown in FIG. 12. The left locking tab 158 is provided to a left peripheral edge distal end 151c on the external surface of the upper peripheral wall 151 of the upper case half 132. On the external surface of the upper peripheral wall 151, the right locking tab 159 is provided to a right peripheral edge distal end 151d.

The left locking tab 158 is capable of elastic deformation in the left-right direction about an upper end part 158a, as shown in FIG. 15, and a clip tab 158b is formed at the lower end of the left locking tab 158.

The right locking tab 159 is a member that is left-right symmetrical to the left locking tab 158, as shown in FIG. 15. The right locking tab 159 is capable of elastic deformation in the left-right direction about an upper end part 159a, and a clip tab 159b is formed at the lower end of the right locking tab 159.

An example of latching the left and right locking tabs 158, 159 in the left and right locking tab receivers 156, 157 will be described in detail using FIGS. 15, 16A, and 16B.

A left latching part 167 if provided to a left peripheral edge center part 151e, and a right latching part 168 is provided to a right peripheral edge center part 151f on the external surface of the upper peripheral wall 151. The left latching part 167 is in contact with a rear wall 165a (see FIG. 13) of the left stopper 165, and the right latching part 168 is in contact with a rear wall 166a (see FIG. 13) of the right stopper 166.

The reason that the left and right latching parts 167, 168 are in contact with the rear walls 165a, 166a of the left and right stoppers 165, 166 will be described in detail using FIG. 17B.

The semicircular upper half opening 126c (see also FIG. 11) that opens downward is formed in the center in the vehicle width direction in the upper front wall 152 of the upper case half 132. As previously mentioned, this upper half opening 126c is assembled with the lower half opening 126b (see FIG. 11) of the lower case half 131 to form the opening 126 (see FIGS. 9 and 11).

The hinge support 184 is provided to a peripheral edge part 153a of the upper rear wall 153. The hinge support 184 is formed substantially in a cross-sectional U shape so as to be capable of engaging with the hinge rod 183. Engaging the hinge support 184 with the hinge rod 183 rotatably connects the hinge support 184 to the hinge rod 183. The upper case half 132 can thus open and close with respect to the lower case half 131 about the axis of the hinge rod 183 in a state in which the upper and lower case halves 131, 132 are connected by the hinge rod 183 and the hinge support 184, as previously described.

The latching part 42 is provided to a center portion 151g of the upper peripheral wall 151, as shown in FIG. 11. The latching part 42 has left and right latching parts 185, 186. The left latching part 185 is raised in a ridge shape toward the outside from a center left side 151h of the upper peripheral wall 151. The right latching part 186 is raised in a ridge shape toward the outside from a center right side 151i of the upper peripheral wall 151. The retaining rod 41 (i.e., the left and right hook parts 108, 109) shown in FIG. 3 latches onto the left and right latching parts 185, 186.

Figure 16A:
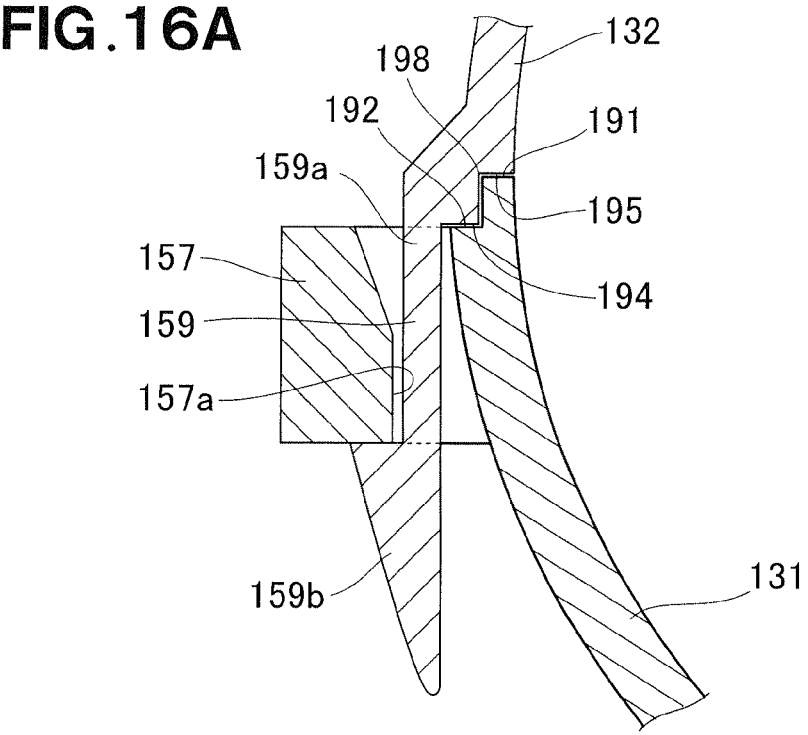
FIGS. 16A and 16B are enlarged views showing a portion labeled 16A in FIG. 15.
Figure 16B:
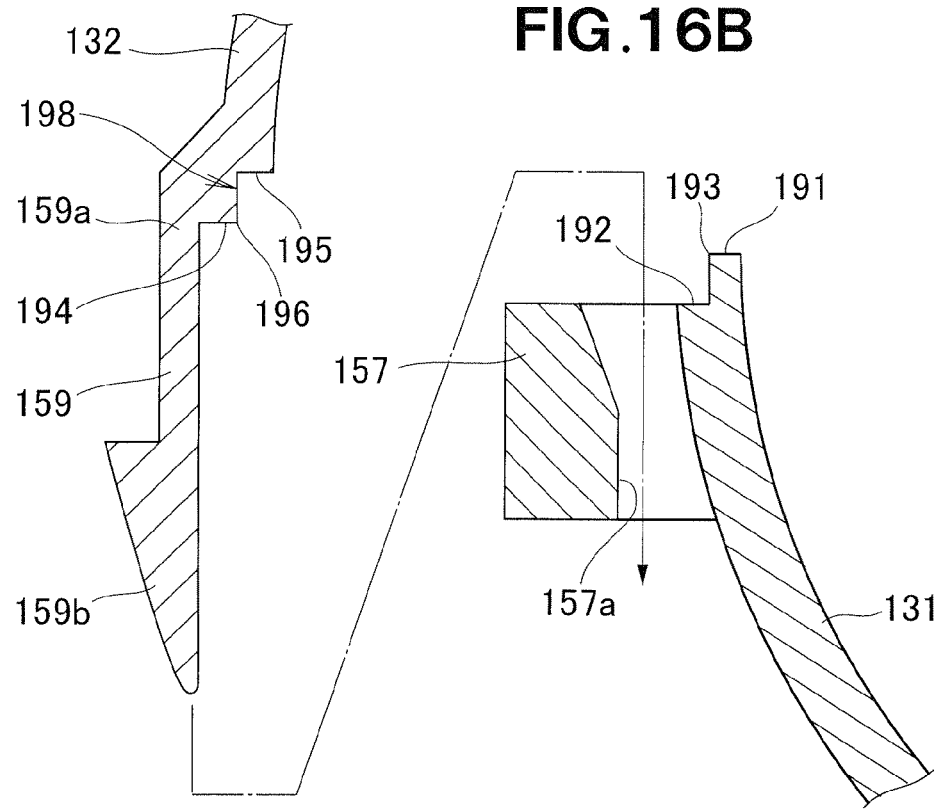

As shown in FIGS. 15, 16A, and 16B, a lower case shoulder 192 is formed along the entire periphery in a substantially rectangular shape on an upper edge 191 of the lower case half 131. An upper case shoulder 195 is formed along the entire periphery in a substantially rectangular shape on a lower edge 194 of the upper case half 132.

In a state in which the upper and lower case halves 131, 132 are assembled, a convex angled part 193 of the upper edge 191 is in contact with the upper case shoulder 195, and a convex angled part 196 of the lower edge 194 is in contact with the lower case shoulder 192, as shown in FIG. 16B. A labyrinth structure (see FIG. 16A) can thus be formed in which mating parts 198 of the upper edge 191 of the lower case half 131 and the lower edge 194 of the upper case half 132 are bent substantially into the shape of a crank. The water resistance of the mating part 198 can thereby be increased, and water can be prevented from penetrating into the gas cylinder case 26.

The procedure for attaching the gas cylinder case 26 to the receiver 25 will next be described based on FIGS. 17 through 19.

Since the receiver 25 and the gas cylinder case 26 are each substantially symmetrical on the left and right, the right-side members will be described in FIGS. 17A and 17B, and the left-side members will not be described.

In FIG. 17A, to attach the gas cylinder case 26 to the receiver 25, the retaining rod 41 is first retained in the released position P2 against the urging force of the locking spring 105 (see FIG. 3). The switch valve 38 is positioned in the fuel cutoff state, i.e., the fuel cutoff position P4. In this state, the gas cylinder case 26 is positioned above the receiver body 31 of the receiver 25.

The right front slider 82 of the gas cylinder case 26 is then moved as indicated by the arrow A along the inclined surface 64a of the right guide groove 64. At the same time, the right rear slider 84 of the gas cylinder case 26 is moved as indicated by the arrow B.

The right front slider 82 is in contact with the bottom part 44 of the receiver body 31, and is positioned to the rear of an insertion mouth 65c of the right front slider guide 65. At the same time, the right rear slider 84 is positioned to the rear of an insertion mouth 66c of the right rear slider guide 66.

In this state, the bottom part 163 (see also FIG. 15) of the gas cylinder case 26 is placed on the bottom part 44 of the receiver body 31.

By moving the gas cylinder case 26 forward, the right front slider 82 inserts into the right front slider guide 65 from the insertion mouth 65c as indicated by the arrow C. At the same time, the right rear slider 84 inserts into the right rear slider guide 66 from the insertion mouth 66c as indicated by the arrow D. The right front slider 82 is thereby supported by the right front slider guide 65, the right rear slider 84 is supported by the right rear slider guide 66, and the gas cylinder case 26 is positioned in the attachment position of the receiver body 31 by a simple operation.

The cassette gas cylinder 21 is accommodated in the gas cylinder case 26. The cassette gas cylinder 21 is positioned in the proper attachment position with respect to the gas cylinder case 26 by the cut-out part 141 of the flange 95 engaging with the positioning protrusion 142, as shown in FIG. 9. Consequently, by positioning the gas cylinder case 26, the cassette gas cylinder 21 is properly positioned with respect to the receiver 25 (receiver body 31).

In FIG. 17B, the retaining rod 41 is returned to the retention position P1 as indicated by the arrow E by the urging force of the locking spring 105 (FIG. 3). The left and right hook parts 108, 109 are latched onto the latching part 42 having the left and right latching parts 185, 186 (FIG. 11). Consequently, the gas cylinder case 26 is retained so as not to move to the rear. The gas cylinder case 26 is thereby attached to the receiver 25.

In the misalignment prevention means 164, the left latching part 167 latches onto the rear wall 165a of the left stopper 165, and the right latching part 168 latches onto the rear wall 166a of the right stopper 166. When the retaining rod 41 is latched onto the latching part 42, the upper case half 132 can thereby be prevented from being misaligned forward with respect to the lower case half 131 in the longitudinal direction.

The upper and lower case halves 132, 131, i.e., the gas cylinder case 26, can thereby be satisfactorily retained by the retaining rod 41.

Figure 18A:
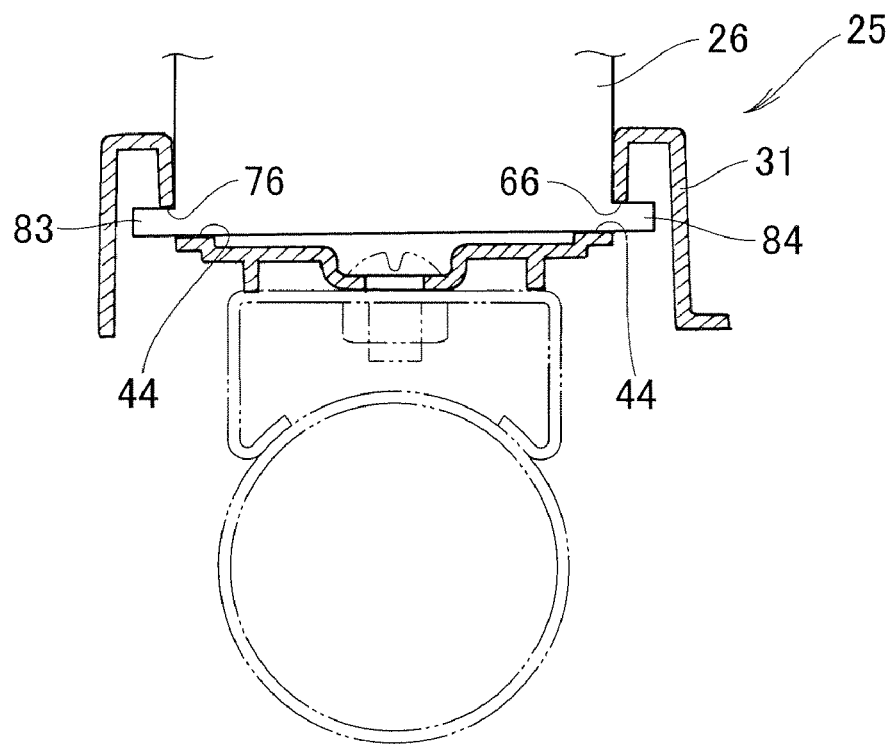
FIGS. 18A and 18B are views showing sliders fitted into slider guides.
Figure 18B:
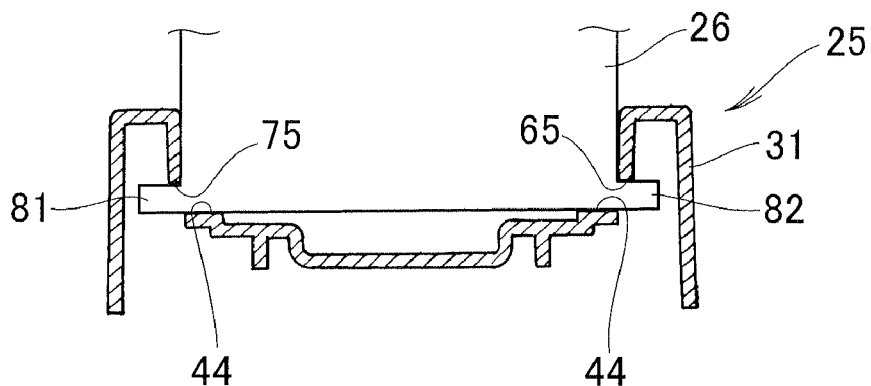

FIGS. 18A and 18B show a state in which the sliders are inserted into the slider guides.

In FIG. 18A, the left rear slider 83 is retained in the left rear slider guide 76, and the right rear slider 84 is retained in the right rear slider guide 66.

In FIG. 18B, the left front slider 81 is retained in the left front slider guide 75, and the right front slider 82 is retained in the right front slider guide 65.

The gas cylinder case 26 is thereby kept attached to the receiver 25 (receiver body 31).

FIG. 19 shows a state in which the switch valve 38 is switched to the fuel feeding state.

The operator operates the operating lever 98 of the switch valve 38 to move the operating lever 98 from the fuel cutoff position P4 to the fuel feeding position P3, as indicated by the arrow F. The switch valve 38 is thereby kept in the fuel feeding state of feeding fuel 24 (FIG. 10) to the gas engine 12 shown in FIG. 1, and the gas engine 12 is enabled to start. In this state, the driven latch piece 118 of the operating lever 98 makes contact with the driving contactor 116 (driving latch piece 122 or overhang piece 121) from above.

The operating lever 98 is thus placed in the fuel feeding position P3, and the switch valve 38 is switched to the fuel feeding state before the gas engine 12 is started.

The procedure for removing the gas cylinder case 26 from the receiver 25 will next be described based on FIGS. 20A and 20B.

Figure 20A:
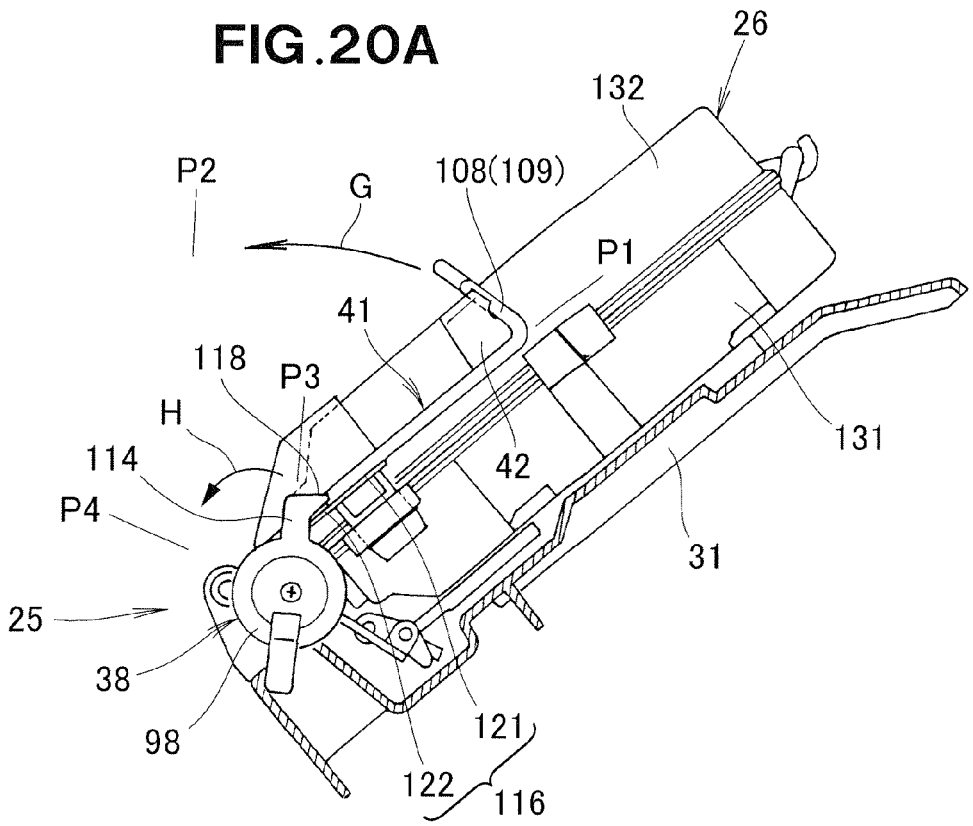
FIGS. 20A and 20B are views showing the switch valve moved in conjunction with the retaining rod and switched to a fuel cutoff state.

In FIG. 20A, the retaining rod 41 is removed from the latching part 42 and lifted toward the released position P2 as indicated by the arrow G. The driving contactor 116 moves together with the retaining rod 41 as indicated by the arrow G.

The movement of the driving contactor 116 causes the driven latch piece 118 of the driven protrusion 114 to be pushed up by the driving contactor 116 so as to move as indicated by the arrow H. The driven protrusion 114 (driven latch piece 118) is thus moved by the driving contactor 116, and the operating lever 98 can be caused to move to the fuel cutoff position P4.

The switch valve 38 can thus be switched from the fuel feeding state to the fuel cutoff state in conjunction with the movement of the retaining rod 41, by a simple structure in which the driving contactor 116 is provided to the retaining rod 41, and the driven protrusion 114 is provided to the operating lever 98.

Figure 20B:
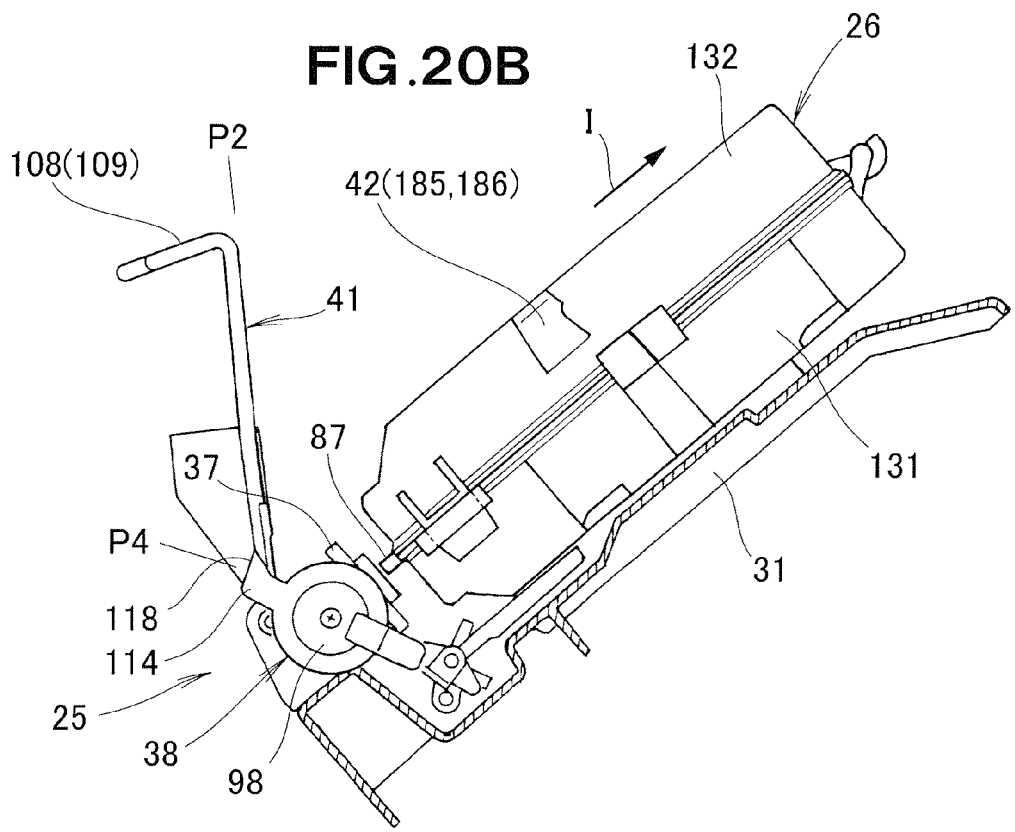

In FIG. 20B, removing the retaining rod 41 (left and right hook parts 108, 109) from the latching part 42 (left and right latching parts 185, 186) enables the gas cylinder case 26 to move in the direction indicated by arrow I. The gas cylinder case 26 can be removed from the receiver body 31 of the receiver 25 by moving the gas cylinder case 26 as indicated by the arrow I.

The gas cylinder case 26 can be easily removed from the receiver body 31 merely by removing the retaining rod 41 from the latching part 42 against the urging force of the locking spring 105 (FIG. 3), and ease of use can therefore be enhanced.

The switch valve 38 then moves in conjunction with the movement of the retaining rod 41, and is switched to the fuel cutoff state. There is therefore no risk of the fuel 24 (FIG. 10) in the cassette gas cylinder 21 flowing out from the nozzle 87 when the nozzle 87 of the cassette gas cylinder 21 shown in FIG. 17 is removed from the base support 37.

When retention of the gas cylinder case 26 (cassette gas cylinder 21) by the retaining rod 41 is released, the switch valve 38 is able to move from the fuel feeding state to the fuel cutoff state in conjunction with the movement of the retaining rod 41. There is therefore no need to separately operate the switch valve 38 to switch from the fuel feeding state to the fuel cutoff state when the gas cylinder case 26 (cassette gas cylinder 21) is removed from the receiver body 31 of the receiver 25. The gas cylinder case 26 (cassette gas cylinder 21) can thereby be removed from the receiver body 31 by a simple procedure, and ease of use can be enhanced.

In the present embodiment, a walk-behind cultivator was described as an example of a work machine 10 to which the cassette gas cylinder attachment structure 20 is applied, but the present invention is not limited by this example, and can also be applied to a mower, outboard motor, electrical generator, or other work machine.

This embodiment was described with reference to an example in which left and right locking tabs 158, 159 are provided to the upper case half 132, and left and right locking tab receivers 156, 157 are provided to the lower case half 131, but this example is not limiting, and a configuration may be adopted in which the left and right locking tab receivers 156, 157 are provided to the upper case half 132, and the left and right locking tabs 158, 159 are provided to the lower case half 131.

This embodiment was described with reference to an example in which the sliders 81 through 84 are provided to the gas cylinder case 26, and the slider guides 65, 66, 75, 76 are provided to the receiver 25, but this example is not limiting, and a configuration may be adopted in which the slider guides 65, 66, 75, 76 are provided to the gas cylinder case 26, and the sliders 81 through 84 are provided to the receiver 25.

Furthermore sand, dead leaves, and the like were described as examples of the debris discharged from the debris discharge port 56 in the embodiment above, but the debris is not limited to these examples.

The cassette gas cylinder 21, receiver 25, gas cylinder case 26, receiver body 31, valve coupling means 35, base support 37, switch valve 38, retaining rod 41, latching part 42, debris discharge port 56, slider guides 65, 66, 75, 76, sliders 81 through 84, flange receiving part 92, flange 95, operating lever 98, locking spring member 105, driven protrusion 114, driving contactor 116, opening 126, lower case half 131, upper case half 132, coil spring 133, cut-out part 141, positioning protrusion 142, left locking tab receiver 156, right locking tab receiver 157, left locking tab 158, right locking tab 159, misalignment prevention means 164, left and right stoppers 165, 166, left and right latching parts 167, 168, left fitting groove 174, right fitting groove 175, retaining protrusion 176, mating part 198, and other components described in the embodiment are not limited to the shapes described, and may be modified as appropriate.

The present invention is suitable for application to a work machine that is configured so that a cassette gas cylinder for feeding fuel to the engine of the work machine is detachably attached to the body of the work machine via a gas cylinder case.

Obviously, various minor changes and modifications of the present invention are possible in light of the above teaching. It is therefore to be understood that within the scope of the appended claims the invention may be practiced otherwise than as specifically described.

What is claimed is:

1. A work machine comprising:
   a machine body;
   an engine mounted to the machine body;
   a cassette gas cylinder storing fuel to be fed to the engine, the cassette gas cylinder including a base;

a gas cylinder case for accommodating the cassette gas cylinder, the gas cylinder case being detachably attached to the work machine and has an opening at an end thereof; and a base support which supports the base of the cassette gas cylinder, wherein the base of the cassette gas cylinder is exposed to an outside through the opening of the gas cylinder case when the cassette gas cylinder is accommodated in the gas cylinder case.

2. The work machine of claim 1, wherein the cassette gas cylinder includes a base which has a flange formed with a cut-out part, and the gas cylinder case includes a positioning protrusion capable of engaging with the cut-out part.

3. The work machine of claim 2, wherein the gas cylinder case comprises an upper case half and a lower case half for vertically clamping an external peripheral part of the flange, locking tabs are provided to one of the upper and lower case halves, locking tab receivers for retaining the locking tabs are provided to other one of the upper and lower case halves, and the upper and lower case halves are maintained in an assembled state by the locking tabs being retained by the locking tab receivers.

4. The work machine of claim 3, wherein the upper and lower case halves have mating parts that, when mated, form a labyrinth structure.

5. The work machine of claim 1, further comprising:
a retaining member for retaining the gas cylinder case in a state of being attached to the work machine;
a switch valve for switching between a fuel feeding state in which the fuel is fed to the engine and a fuel cutoff state in which feeding of the fuel to the engine is stopped; and
valve coupling means for switching the switch valve from the fuel feeding state to the fuel cutoff state in conjunction with movement of the retaining member when retention of the gas cylinder case by the retaining member is released.

6. The work machine of claim 5, wherein the switch valve is provided with an operating lever for switching between the fuel feeding state and the fuel cutoff state, the valve coupling means includes a driven protrusion protruding from the operating lever and a driving protrusion capable of being contacted by the driven protrusion, the driving protrusion being provided to the retaining member, the driven protrusion makes contact with the driving protrusion when a switch is made to the fuel feeding state by the operating lever in a state in which the gas cylinder case is retained by the retaining member, and when the retaining member moves in a direction of releasing retention of the gas cylinder case, the driven protrusion is moved by the driving protrusion, and the operating lever moves to a position of the fuel cutoff state.

7. The work machine of claim 5, wherein the gas cylinder case has a latching part for locking the retaining member in place, and the retaining member is urged by a locking spring so as to be retained in a state of being latched to the latching part by the locking spring.

8. The work machine of claim 7, wherein the gas cylinder case comprises an upper case half and a lower case half, the latching part is provided to the upper case half, and misalignment prevention means is provided to the upper and lower case halves so that the upper case half is not misaligned in a longitudinal direction with respect to the lower case half in a state in which the retaining member is latched on the latching part.

9. The work machine of claim 8, wherein the misalignment prevention means comprises left and right stoppers provided to the lower case half, and left and right latching parts for engaging with the left and right stoppers, respectively, the latching parts being provided to the upper case half.

10. The work machine of claim 1, wherein the gas cylinder case is detachably attached to a case mount provided to the work machine, the case mount has a base support for supporting the base provided to the cassette gas cylinder, one of the gas cylinder case and the case mount has sliders for engaging with other of the gas cylinder case and the case mount, and the other of the gas cylinder case and the case mount has slider guides for supporting the sliders so that the sliders can slide toward the base support.

11. The work machine of claim 10, wherein the cassette gas cylinder includes a base with a cut-out part formed in a flange thereof, and a positioning protrusion capable of engaging with the cut-out part is provided inside the gas cylinder case.

12. The work machine of claim 10, wherein the case mount has a debris discharge port for discharging debris, the debris discharge port being positioned at the lowermost part of a bottom part of the case mount.

13. The work machine of claim 1, wherein the work machine includes a base support for supporting the base provided to the cassette gas cylinder, and the base support is provided with a flange receiving part with which a flange formed along an external periphery of the base makes contact.

14. The work machine of claim 13, wherein the gas cylinder case in which the cassette gas cylinder is accommodated has an opening through which the flange of the cassette gas cylinder is exposed to outside, the opening being at a distal end of the gas cylinder case, and an elastic member for urging the cassette gas cylinder toward the opening is provided at a proximal end of the gas cylinder case.

15. The work machine of claim 13, wherein the gas cylinder case is retained by a retaining member provided to the work machine, the retaining member latches onto a latching part provided to the gas cylinder case, and the gas cylinder case is urged toward the flange receiving part by the retaining member that is latched onto the latching part, so that the flange of the cassette gas cylinder comes in contact with the flange receiving part.

16. The work machine of claim 14, wherein the elastic member comprises a coil spring, the gas cylinder case comprises an upper case half and a lower case half, and the gas cylinder case is provided with fitting grooves in which a proximal end of the coil spring fits, and a retaining protrusion for keeping the proximal end of the coil spring fitted in the fitting grooves, the fitting grooves and the retaining protrusion being provided at a proximal end of one of the upper and lower case halves.

17. The work machine of claim 1, wherein the cassette gas cylinder has a flange formed along an external periphery of the base, the flange having an external peripheral portion, and the opening of the gas cylinder case has a peripheral edge which is in contact with the external peripheral portion of the flange when the cassette gas cylinder is accommodated in the gas cylinder case.

* * * * *